United States Patent [19]
Iwahori et al.

[11] Patent Number: 6,111,392
[45] Date of Patent: Aug. 29, 2000

[54] POWER SOURCE DEVICE INCLUDING A PLURALITY OF SWITCHING CIRCUIT FOR POWER CONVERSION WITH SWITCHING ELEMENTS USED IN COMMON

[75] Inventors: Yutaka Iwahori; Hiroichi Shinbori; Tsutomu Shiomi; Shinji Hizuma; Toshiaki Nakamura, all of Kadoma, Japan

[73] Assignee: Matsushita Electric Works, Ltd., Osaka, Japan

[21] Appl. No.: 09/065,076

[22] PCT Filed: Sep. 8, 1997

[86] PCT No.: PCT/JP97/03162

§ 371 Date: Apr. 24, 1998

§ 102(e) Date: Apr. 24, 1998

[87] PCT Pub. No.: WO98/10509

PCT Pub. Date: Mar. 12, 1998

[30] Foreign Application Priority Data

Sep. 9, 1996 [JP] Japan ................................. 8-238255
Jun. 25, 1997 [JP] Japan ..................................... 9-169184

[51] Int. Cl.$^7$ ............................................. G05F 1/46
[52] U.S. Cl. ....................... 323/224; 323/225; 363/124
[58] Field of Search ................................. 323/222, 223, 323/224, 225, 259; 363/65, 71, 124

[56] References Cited

FOREIGN PATENT DOCUMENTS 2-282809  11/1990  Japan .

*Primary Examiner*—Y. J. Han
*Attorney, Agent, or Firm*—Lynn & Lynn

[57] ABSTRACT

A power source device restricts any increase in a switching current to switching elements commonly used in two such different power source circuits as chopper and inverter circuits, while maintaining control independence of these circuits, by setting a period in which among currents flowing to the commonly used switching elements, the current flowing at least from one of the power source circuits has a polarity inverse to that of the current from at least the other power source circuit, to be in mutually cancelling directions.

25 Claims, 26 Drawing Sheets

FIG.11
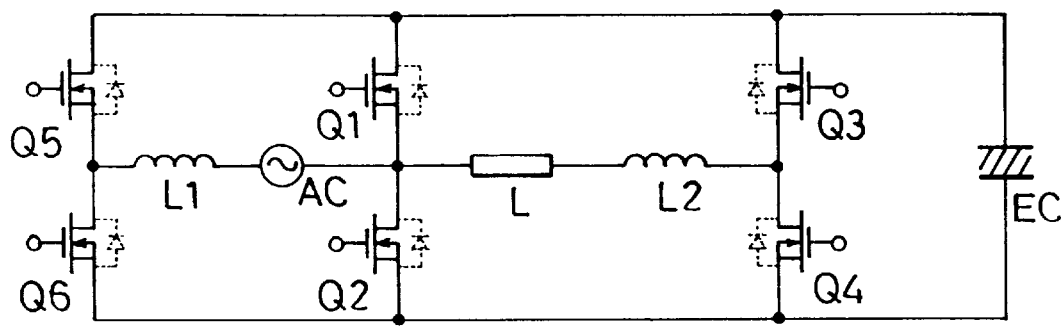
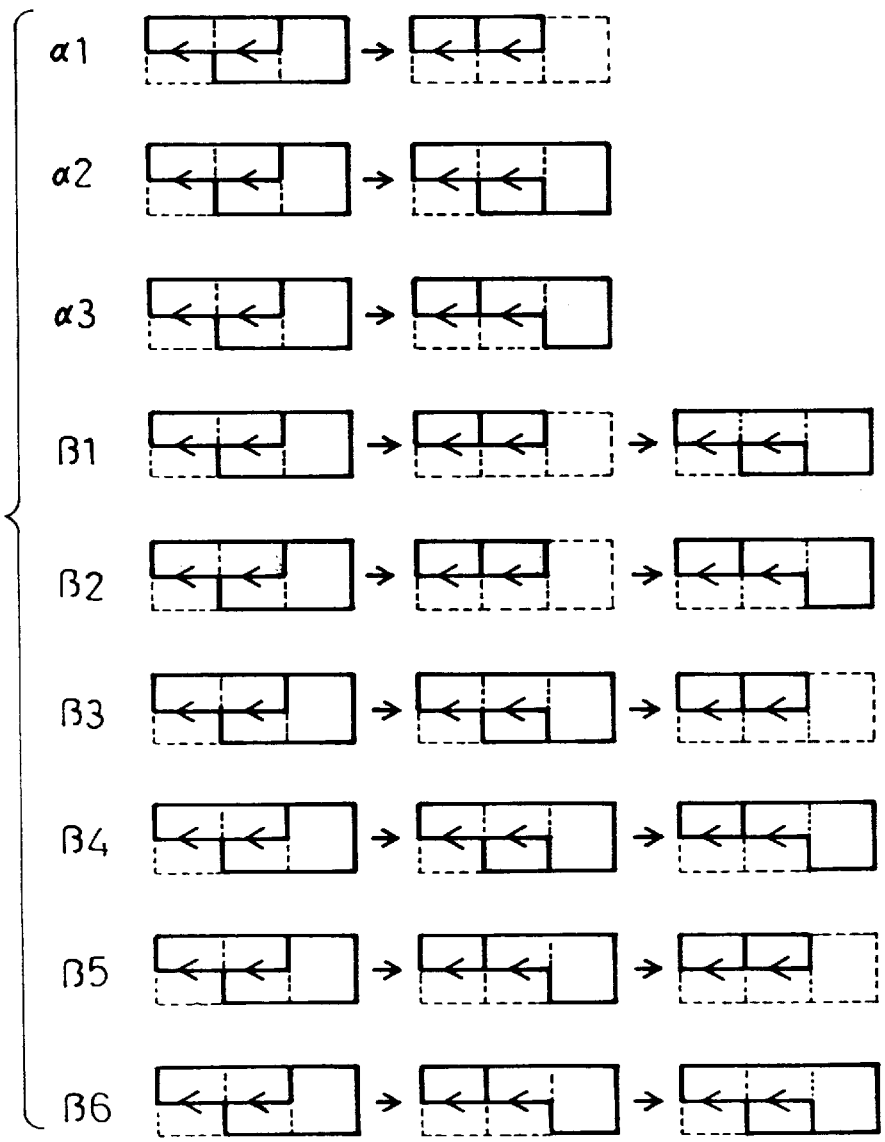
FIG.12

POWER SOURCE DEVICE INCLUDING A PLURALITY OF SWITCHING CIRCUIT FOR POWER CONVERSION WITH SWITCHING ELEMENTS USED IN COMMON

TECHNICAL FIELD OF THE INVENTION

This invention relates to a power source device in which a plurality of switching circuits performing a power conversion respectively commonly use a switching element and, more particularly, to a power source device provided with an inverter circuit for improving any distortion of an input from an AC power source by means of a chopper circuit and for supplying to a load circuit a low frequency output synchronized with the AC power source.

BACKGROUND ART

An example of the power source device of this kind has been disclosed in Japanese Patent Laid-Open Publication No. 2-282809, in which the power source devices comprise, as shown in FIG. 24, a boosting chopper circuit for improving the input current distortion by means of switching elements Q1 and Q2, inductor L1 and diodes D5 and D6, and a buck converter for limiting a load current by means of switching elements Q1–Q4 and inductor L2.

Referring more specifically to FIG. 24, there are connected, in parallel to a smoothing capacitor C, series connections respectively of diodes D1 and D2, of diodes D3 and D4, of the diodes D5 and D6, of the switching elements Q1 and Q2 and of the switching elements Q3 and Q4. A junction point between the switching elements Q1 and Q2 and a junction point between the diodes D1 and D2 are connected. Further, a junction point between the switching elements Q3 and Q4 and junction point between the diodes D3 and D4 are connected. Between the junction point of the switching elements Q1 and Q2 and the junction point of the switching elements Q3 and Q4, a series connection of the inductor L2 and a load Z is connected. Between the junction point of the diodes D5 and D6 and the junction point of the switching elements Q1 and Q2, a series connection of an AC power source P through a filter circuit F to the inductor L1 is connected.

In this case, a control circuit (not shown) is controlling ON/OFF operation of the switching elements Q1–Q4 with outputs ON/OFF signals to gate electrodes of the switching elements Q1–Q4, so that, in positive half cycles of AC source power, the switching element Q1 is alternately made ON and OFF, the switching elements Q2 and Q3 are made OFF and the switching element Q4 is made ON. In negative half cycles, on the other hand, the switching element Q2 is alternately made ON and OFF, the switching elements Q1 and Q4 are made OFF and the switching element Q3 is made ON.

The operation of the conventional device of FIG. 24 shall be described with reference to FIG. 25. First, when the AC power source P is in the positive half cycle so that the switching elements Q1 and Q4 are ON and the switching elements Q2 and Q3 are OFF, a current flows, as shown in FIG. 25a, through a path of the AC power source P, filter circuit F, diode D5, switching element Q1 and inductor L1, to have an energy accumulated in the inductor L1. Also, a current flows from the smoothing capacitor C through a path of the switching element Q1, inductor L2, load circuit Z and switching element Q4 to cause a voltage at the smoothing capacitor C dropped by the inductor L2 and supplied to the load circuit Z. Further, with the current flowing to the inductor L2, an energy is accumulated in the inductor L2.

Next, as the switching element Q1 only is made OFF, a voltage is generated across the inductor L1 by the accumulated energy in the inductor L1, and this voltage is charged through the diode D2 in the smoothing capacitor C as superposed on a voltage of the AC power source P. That is, as shown in FIG. 25b, a current flows through a path of the AC power source P, filter circuit F, diode D5, smoothing capacitor C, diode D2 and inductor L1, to cause the energy in the inductor L1 discharged. Due to this, there is always flowing a current of high frequency from the AC power source P, and any input current distortion is improved by shaping the waveform of the current by means of the filter circuit F. At the smoothing capacitor C, further, there is obtained a voltage higher than a peak value of the AC power source P. Still further, a regenerative current owing to the accumulated energy in the indutor L2 flows through a path of the inductor L2, load circuit Z, switching element Q4 and diode D2. Thereafter, the operation of FIGS. 25a and 25b is repeated as a result of the turning ON and OFF at a high frequency of the switching element Q1, and a DC voltage in one direction is supplied to the load circuit Z.

Next, in the negative half cycle of the AC power source P in which the switching elements Q1 and Q4 are OFF and the switching elements Q2 and Q3 are ON, a current flows, as shown in FIG. 25c, through a path of the AC power source P, filter circuit F, inductor L1, switching element Q2 and diode D6, and an energy is accumulated in the inductor L1. From the smoothing capacitor C, further, a current flows through a path of the switching element Q3, load circuit Z, inductor L2 and switching element Q2, to cause the voltage at the smoothing capacitor C dropped by the inductor L2 and supplied to the load circuit Z. Still further, with the current flowing to the inductor L2, an energy is accumulated in the inductor L2.

Next, as the switching element Q2 only is made OFF, a voltage is generated across the inductor L1 by the accumulated energy in the inductor L1, and this voltage is charged in the smoothing capacitor C through the diode D1 as superposed on the voltage of the AC power source P. That is, as shown in FIG. 25d, a current flows through a path of the AC power source P, filter circuit F, inductor L1, diode L1, smoothing capacitor C and diode D6, and the energy in the inductor L1 is discharged. Due to this, there is always flowing a current of high frequency from the AC power source P, and any distortion in the input current is improved by shaping the waveform of the current by means of the filter circuit F. At the smoothing capacitor C, further, there is obtained a voltage higher than the peak value of the AC power source P. Still further, a regenerative current owing to the accumulated energy in the inductor L2 flows through a path of the inductor L2, diode D1, switching element Q3 and load circuit Z. Thereafter, the operation of FIGS. 25c and 25d is repeated as a result of the turning ON and OFF at a high frequency of the switching element Q2, and a reverse directional DC voltage is supplied to the load circuit Z. With the foregoing operation, a square wave voltage of the polarity inverting in synchronism with every half cycle of the AC power source P is supplied to the load circuit Z.

In the positive half cycles of the AC power source, as has been described, the switching element Q1 operates concurrently as a switching element of a chopper circuit and as a switching element of an inverter circuit. In the negative half cycles of the AC power source, on the other hand, the switching element Q2 operates concurrently as the switching element of the chopper circuit and as the switching element in the inverter circuit.

As another conventional example, there may be shown in FIG. 26 a power source device, which comprises a boosting and dropping chopper circuit for improving the input distortion by means of the switching elements Q1 and Q2, inductor L1 and diodes D1, D2 and D5–D10, and a buck converter for limiting the load current by means of the switching elements Q1–Q4 and inductor L2. In this case, a series circuit of the diodes D1 and D2 and a series connection of the diodes D3 and D4 are connected in inverse parallel to the smoothing capacitor C, and a series connection of the switching elements Q3 and Q4 are connected in parallel to the smoothing capacitor C. A series connection of the diodes D5 and D6 and a series connection of the switching elements Q1 and Q2 are connected in inverse parallel, and a circuit of a series connection in the order of the diode D7, switching elements Q1 and Q2 and diode D8 and a series circuit of the diodes D9 and D10 are connected in inverse parallel to the smoothing capacitor C. Further, a junction point between the diodes D1 and D2 and a junction point between the switching elements Q1 and Q2 are connected, and a junction point between the diodes D3 and D4 and a junction point between the switching elements Q3 and Q4 are connected. Still further, the inductor L1 is connected between the junction point of the switching elements Q1 and Q2 and a junction point of the diodes D9 and D10, a series connection of the inductor L2 and load circuit Z is connected between the junction point of the switching elements Q1 and Q2 and the junction point of the switching elements Q3 and Q4, and the AC power source P is connected between a junction point of the diodes D5 and D6 and the junction point of the diodes D9 and D10.

Referring further to this power source device with reference to FIG. 26 and additionally to FIG. 27, initially in the positive half cycle of the AC power source P in which the switching elements Q1 and Q4 are ON and the switching elements Q2 and Q3 are OFF, a current flows, as shown in FIG. 26a, through a path of the AC power source P, filter circuit F, diode D5, switching element Q1 and inductor L1, and an energy is accumulated in the inductor L1. Further, a current flows from the smoothing capacitor C through a path of the diode D7, switching element Q1, inductor L2, load circuit Z and switching element Q4, and a voltage at the smoothing capacitor C is supplied to the load circuit Z as dropped by the inductor L2. Also, with the current flowing to the inductor L2, an energy is accumulated in the inductor L2.

When the switching element Q1 only is made OFF, next, a voltage is generated across the inductor L1 by the accumulated energy in the inductor L1, and is charged through the diode D9 in the smoothing capacitor C. That is, as shown in FIG. 26b, a current flows through a path of the inductor L1, diode D9, smoothing capacitor C, diode D2 and inductor L1, and the energy in the inductor L1 is discharged. Due to this, the current from the AC power source P is caused not to flow directly to the smoothing capacitor C, but the current once made to flow to the inductor L1 is accumulated therein as the energy, and a regenerative current owing to such accumulated energy is caused to flow to the smoothing capacitor C, so that any rush current upon connection of the AC power source P can be prevented. At the smoothing capacitor C, further, a voltage lower than the peak value of the AC power source P can be obtained. Further, a regenerative current owing to an accumulated energy in the inductor L2 flows through a path of the inductor L2, load circuit Z, switching element Q4 and diode D2. Thereafter, the operation of FIGS. 26a and 26b is repeated by the high frequency ON/OFF operation of the switching element Q1, and the DC voltage in one direction is supplied to the load circuit Z.

Next, in the negative half cycle of the AC power source P in which the switching elements Q1 and Q4 are OFF and the switching elements Q2 and Q3 are ON, a current flows, as shown in FIG. 27a, through a path of the AC power source P, filter circuit F, inductor L1, switching element Q2 and diode D6, and an energy is accumulated in the inductor L1. Also, a current flows from the smoothing capacitor C through a path of the switching element Q3, load circuit Z, inductor L2, switching element Q2 and diode D8, and the voltage at the smoothing capacitor C is supplied to the load circuit Z as dropped by the inductor L2. Also, with the current flowing to the inductor L2, an energy is accumulated in the inductor L2.

When the switching element Q2 only is made OFF, next, a voltage is generated across the inductor L1 by the accumulated energy in the inductor L1, and is charged in the smoothing capacitor C through the diode D1. That is, as shown in FIG. 27b, a current flows through a path of the inductor L1, diode D1, smoothing capacitor C and diode D10, and the energy in the inductor L1 is discharged. The current from the AC power source P is thereby caused not to flow directly to the smoothing capacitor C, and the current flowing to the inductor L1 is once accumulated therein as the energy, and the regenerative current owing to this accumulated energy is made to flow to the smoothing capacitor C, so that any rush current upon connection of the AC power source P can be prevented. Further, there can be also obtained at the smoothing capacitor C a voltage lower than the peak value of AC power source P. Further, a regenerative current owing to the accumulated energy in the inductor L2 flows through a path of the inductor L2, diode D1, switching element Q3 and load circuit Z. Thereafter, the operation of FIGS. 27a and 27b is repeated by the high frequency ON/OFF operation of the switching element Q2, and a DC voltage in reverse direction is supplied to the load circuit Z. With the foregoing operation, a square wave voltage of the polarity inverting in synchronism with every half cycle of the AC power source P is supplied to the load circuit Z.

In the conventional example of FIGS. 24 and 25, however, the switching elements are used commonly in the boost converter and the buck converter so that the currents of both buck-boost converters are caused to flow as superposed to the commonly used switching elements, the withstand amount of current is enlarged, and any effect of cost reduction attained by reducing the number of the switching elements through the common use is rather decreased. Further, as the control signals for the switching elements are also used in common, the independence of control with respect to each circuit is lost so that, in an event where the control is to be made for rendering an output power constant, for example, there arises an instance where an input power is excessively over or below the output power. When the input power is excessively over the output power, a surplus energy is accumulated in the smoothing capacitor so as to raise the voltage across the smoothing capacitor, the voltage applied to the parts is increased, and there arises a problem that a stress is given to the parts according to circumstances.

Such phenomenon becomes particularly remarkable in an event where the conventional device is applied to, for example, a starting device of a high pressure discharge lamp because, in the step of starting the high pressure discharge lamp, the load is low in the impedance and it becomes necessary to supply a large current to the load. That is, there must be provided a constant ON duty in order to let the large current flow to the load but, as the load is low in the impedance, the output power is less. In contrast, the input power will be of an amount in accordance with the ON duty, and there arises a problem that the input power becomes excessively large.

Further, in the conventional example of FIGS. 26 and 27, there are advantages that the voltage of the smoothing capacity is enabled to be set lower than the source voltage, and further any rush current upon connection of the power source can be prevented, since the switching elements are used commonly in both buck-boost converters and buck converters. However, because of the increase in the withstand amount of current of the commonly used switching elements as being the problem in the conventional example of FIGS. 24 and 25, there are problems that a cost reduction is difficult to be contrived, and the independence of control with respect to every circuit is also difficult to be maintained.

DESCRIPTION OF THE INVENTION

The present invention is to overcome the foregoing problems, and to provide a power source device which prevents the switching current flowing through the switching elements used commonly in such two power source circuits as chopper circuit and inverter circuit from being increased, and maintains the independence of the control of the chopper circuit and inverter circuit. It is also an object to provide a power source device in which buck-boost converter and buck converter using in common the switching elements are employed, so that the degree of setting freedom of the voltage of smoothing capacitor with respect to the source voltage can be made high, and, not only the prevention of the rush current upon connection of the power source, but also the reduction of the withstand amount of current of the switching elements is reduced with an operation performed to have the currents of the buck-boost converter and buck converter cancelled each other, while maintaining the independence with respect to each of the circuits.

According to the present invention, this object is to be established by a power source device comprising at least two power converting circuits respectively having at least one switching means, the switching means being provided for being used in common as elements forming at least two of the different power converting circuits, and a control means formed to have a period in which, among currents flowing from the different power converting circuits to the commonly used switching elements, the current flowing from at least one power converting circuit will be of an inverse polarity with respect to the current flowing from at least the other one power converting circuit, so as to flow in mutually cancelling directions.

Here, the switching means should be one of switching element and rectifying element, as will be clear from following description with reference to embodiments.

In the present invention, therefore, it is possible to reduce the currents flowing to the switching elements commonly used in a plurality of switching circuits. It is also possible to have the control of the plurality of switching circuits provided with the independence.

Other objects and advantages of the present invention shall become clear from the following description detailed with reference to embodiments shown in drawings.

BRIEF DESCRIPTION OF THE DRAWINGS

FIG. 11 is a circuit diagram showing still another embodiment according to the present invention, FIG. 12 is an explanatory diagram showing a first group of working aspects from a viewpoint of current loop in the power source device according to the present invention.

BEST MODE FOR WORKING THE INVENTION

Figure 1:
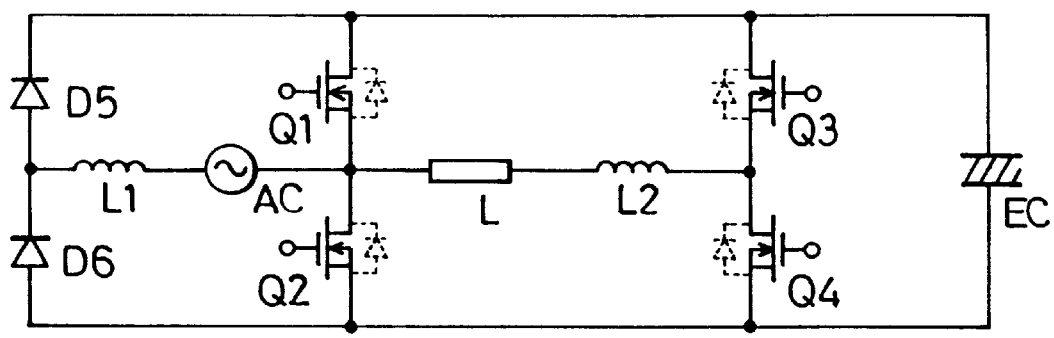
FIG. 1 is a circuit diagram showing a preferable basic formation of the power source device according to the present invention.

FIG. 1 shows a preferable embodiment of the present invention, which has a circuit formation in which a circuit of first and second switching elements Q1 and Q2 connected in series with their forward direction made to coincide and respectively provided with an inverse directional current passing element connected in parallel and a circuit of third and fourth switching elements Q3 and Q4 connected in series with their forward direction made to coincide and respectively provided with an inverse directional current passing element connected in parallel are connected in parallel with a capacitor EC to be in the same polarity, a circuit of first and second rectifying elements D5 and D6 connected in parallel to the capacitor EC so as to be in the same polarity as the current passing elements provided in parallel to the first to fourth switching elements and to coincide at an end of the first rectifying element D5 with an end of each of the first and third switching elements Q1 and Q3, a series circuit of an AC power source AC and a first inductor L1 is connected, through a filter not shown, between a junction point of the two rectifying elements D5 and D6 and a junction point of the first and second switching elements Q1 and Q2, and a series circuit of a load circuit L and a second inductor L2 is connected between a junction point of the first and second switching elements Q1 and Q2 and a junction point of the third and fourth switching elements Q3 and Q4. The series circuit of the AC power source AC and first inductor L1 is connected on the source AC side to the junction point of the first and second switching elements Q1 and Q2, while the series circuit of the load circuit L and second inductor L2 is connected on the load circuit L side to the junction point of the first and second switching elements Q1 and Q2, so that the potential of the load circuit L will be stable in the high frequency. It is also possible to so arrange that the operation will be reversed.

In FIG. 11, there is shown another aspect of the present invention, which power source device has such circuit arrangement that a circuit of the first and second switching elements Q1 and Q2 respectively provided with an inverse directional current passing element connected in parallel and mutually connected in series with their forward direction made to coincide, a circuit of the third and fourth switching elements Q3 and Q4 respectively provided with an inverse directional current passing element connected in parallel and mutually connected in series with their forward direction made to coincide, and a circuit of fifth and sixth switching elements Q5 and Q6 respectively provided with an inverse directional current passing element connected in parallel and mutually connected in series with their forward direction made to coincide are connected in parallel to the capacitor EC to be in the same polarity; the series connection of the AC power source AC and first inductor L1 is connected between the junction point of the first and second switching elements Q1 and Q2 and the junction point of the fifth and sixth switching elements Q5 and Q6; and the series connection of the load circuit L and second inductor L2 is connected between the junction point of the first and second switching elements Q1 and Q2 and the junction point of the third and fourth switching elements Q3 and Q4.

In any case employing either one of the foregoing circuit arrangements, it is preferable that the switching elements respectively provided with the parallel connection of the inverse directional current passing element comprise respectively a field effect transistor having an inverse directional parasitic diode. It may be also possible to use a bipolar transistor having a diode connected in inverse parallel thereto.

While in the followings the optimum working aspects shall be enumerated with reference to current loops in these circuit arrangements, a definition of terms in which general use current loops occur repeatedly hereinafter shall be preliminarily referred to:

A1) A term having at least a period in which a state at which a current of first power converting circuit forms a closed loop comprising the first inductor, fifth rectifying element, capacitor, second field effect transistor and power source, as well as a state at which a current of second power converting circuit forms a closed loop comprising the capacitor, third field effect transistor, second inductor, load circuit and second field effect transistor are caused to concurrently exist. This term shall be referred to simply as [A1] in the following description.

A2) A term having at least a period in which a state at which the current from the first power converting circuit forms a closed loop comprising the first inductor, power source, first field effect transistor, capacitor and sixth rectifying element, as well as a state at which the current from the second power converting circuit forms a closed loop comprising the capacitor, first field effect transistor, load circuit, second inductor and fourth field effect transistor are caused to concurrently exist. This term shall be referred to simply as [A2] in the following description.

B1) A term having at least a period in which a state at which the current from the first power converting circuit forms a closed loop comprising the power source, first inductor, fifth rectifying element and first field effect transistor, as well as a state at which the current from the second power converting circuit forms a closed loop comprising the second inductor, load circuit, first field effect transistor and third field effect transistor are caused to concurrently exist. This term shall be referred to simply as [B1] in the following description.

B2) A term having at least a period in which a state at which the current from the first power converting circuit forms a closed loop comprising the power source, second field effect transistor, sixth rectifying element and first inductor, as well as a state at which the current from the second power converting circuit forms a closed loop comprising the second inductor, fourth field effect transistor, second field effect transistor and load circuit are caused to concurrently exist. In the following description, this term shall be referred to simply as [B2].

C1) A term having at least a period in which a state at which the current from the power converting circuit forms a closed loop comprising the first inductor, fifth rectifying element, capacitor, second field effect transistor and power source, as well as a state at which the current from the second power converting circuit forms a closed loop comprising the second inductor, load circuit, second field effect transistor and fourth field effect transistor are caused to concurrently exist. In the following description, this term shall be referred to simply as [C1].

C2) A term having at least a period in which the state at which the current from the first power converting circuit forms a closed loop comprising the first inductor, power source, first field effect transistor, capacitor, sixth rectifying element and first inductor, as well as a state at which the current from the second power converting circuit forms a closed loop comprising the second inductor, third field effect transistor, first field effect transistor and load circuit are caused to concurrently exist. In the following description, this term shall be referred to simply as [C2].

D1) A term having at least a period in which a state at which the current from the first power converting circuit forms a closed loop comprising the power source, first inductor, fifth rectifying element and first field effect transistor, as well as a state at which the current from the second power converting circuit forms a closed loop comprising the second inductor, load circuit, first field effect transistor, capacitor and fourth field effect transistor are caused to concurrently exist. In the following description, this term shall be referred to simply as [D1].

D2) A term, having at least a period in which a state at which the current from the first power converting circuit forms a closed loop comprising the power source, second field effect transistor, sixth rectifying element and first inductor, as well as a state at which the current from the second power converting circuit forms a closed loop comprising the second inductor, third field effect transistor, capacitor and second field effect transistor are caused to concurrently exist. In the following description, this term shall be referred to simply as [D2].

Figure 13:
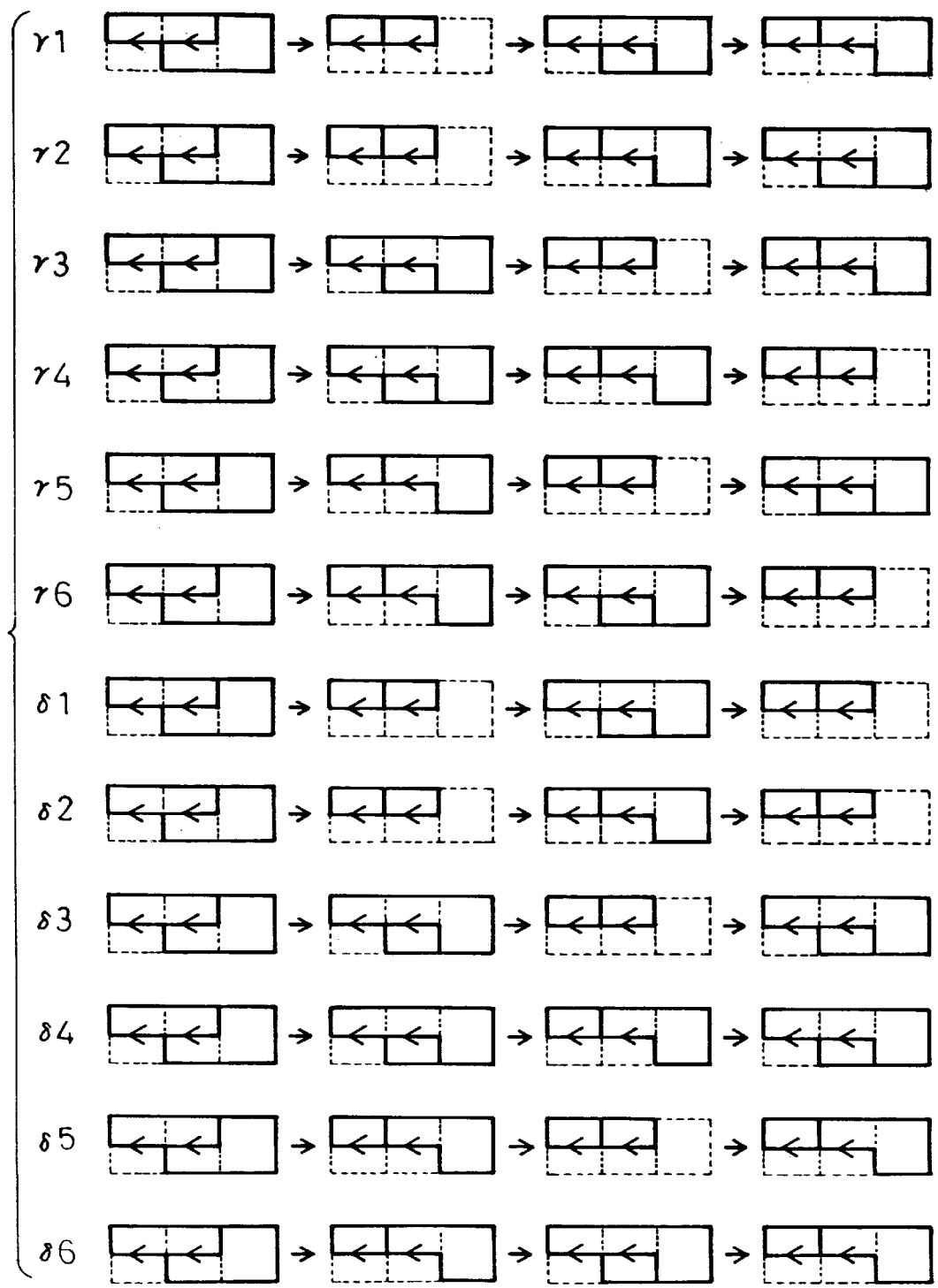
FIG. 13 is an explanatory diagram showing a second group of working aspects from a viewpoint of other current loop in the present invention.
Figure 14:
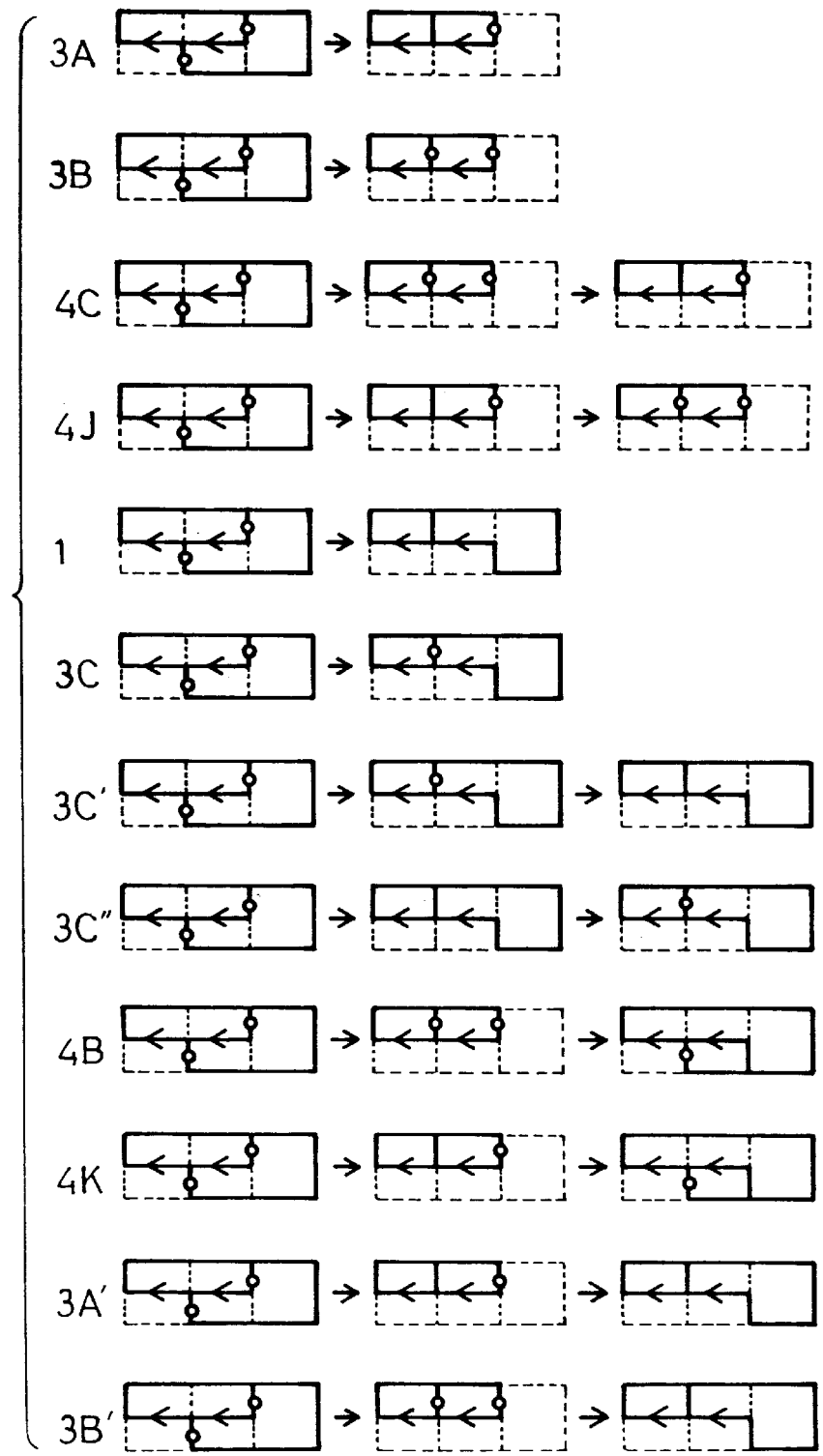
FIG. 14 is an explanatory diagram showing a first group of working aspects relative to switching operation of the power source device according to the present invention.
Figure 15:
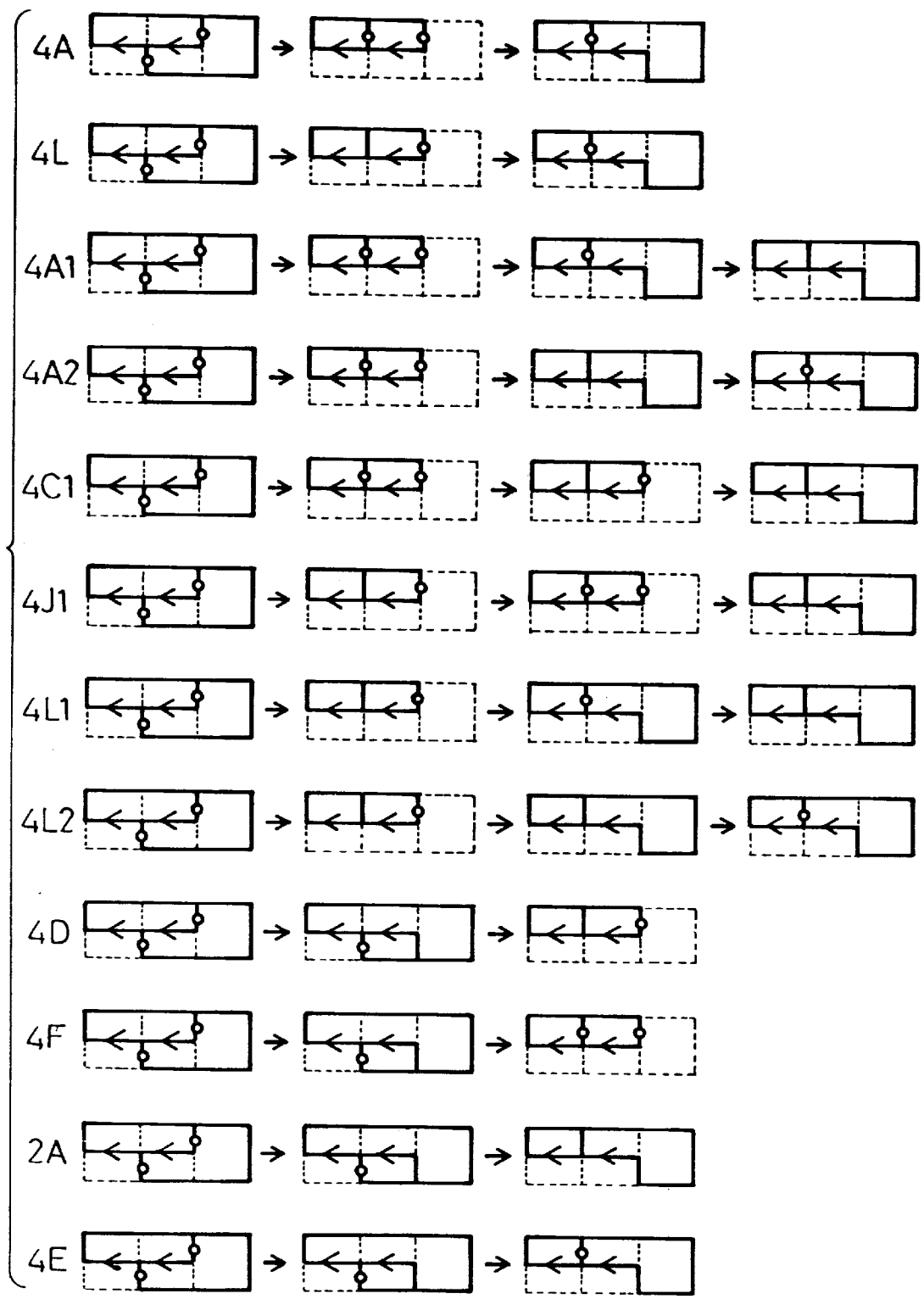
FIG. 15 is an explanatory diagram showing a second group of working aspects relative to another switching operation in the present invention.
Figure 16:
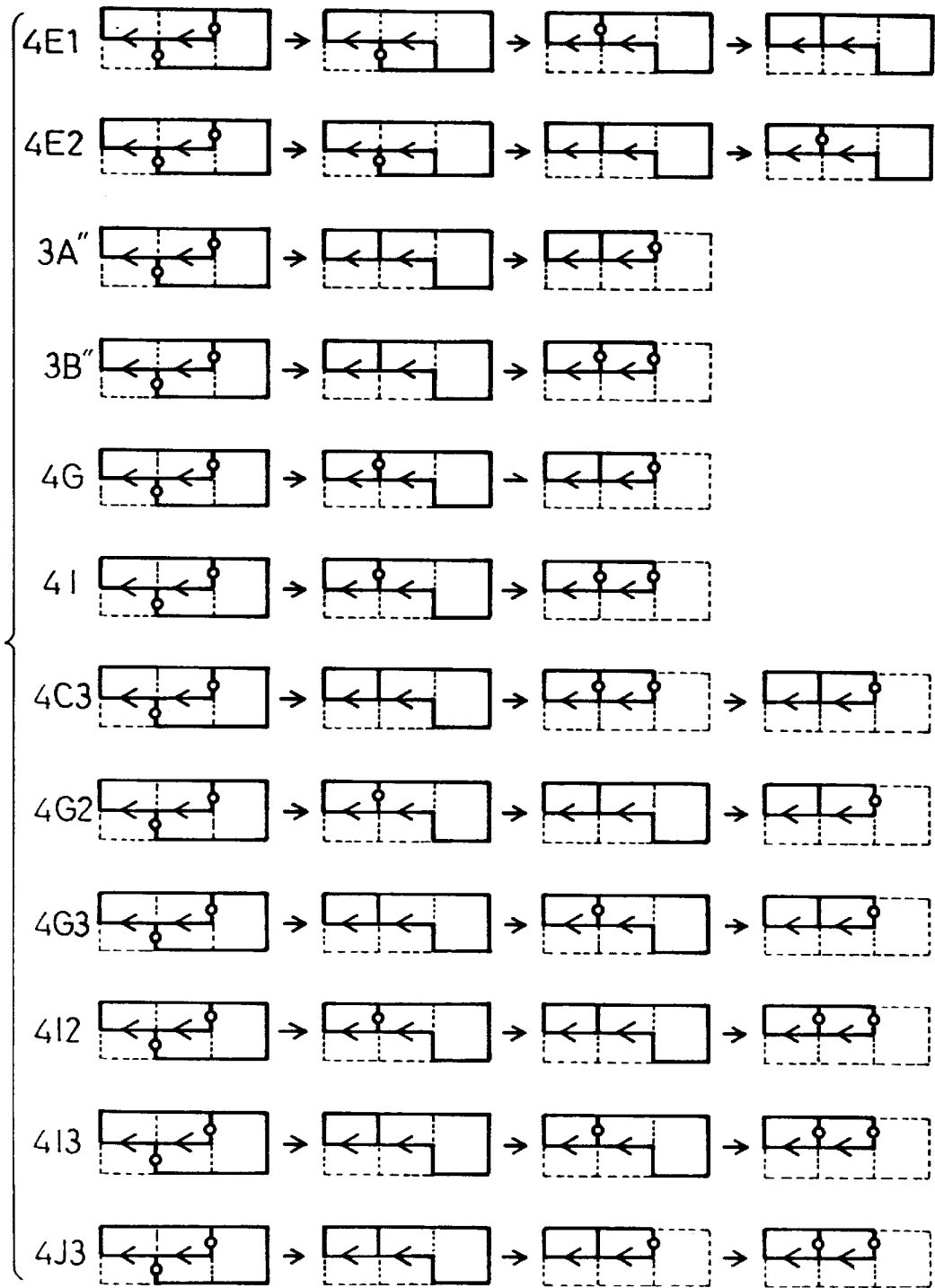
FIG. 16 is an explanatory diagram showing a third group of working aspects relative to still another switching operation in the present invention, FIG. 17 of an explanatory diagram showing a fourth group of working aspects relative to still another switching operation in the present invention.
Figure 17:
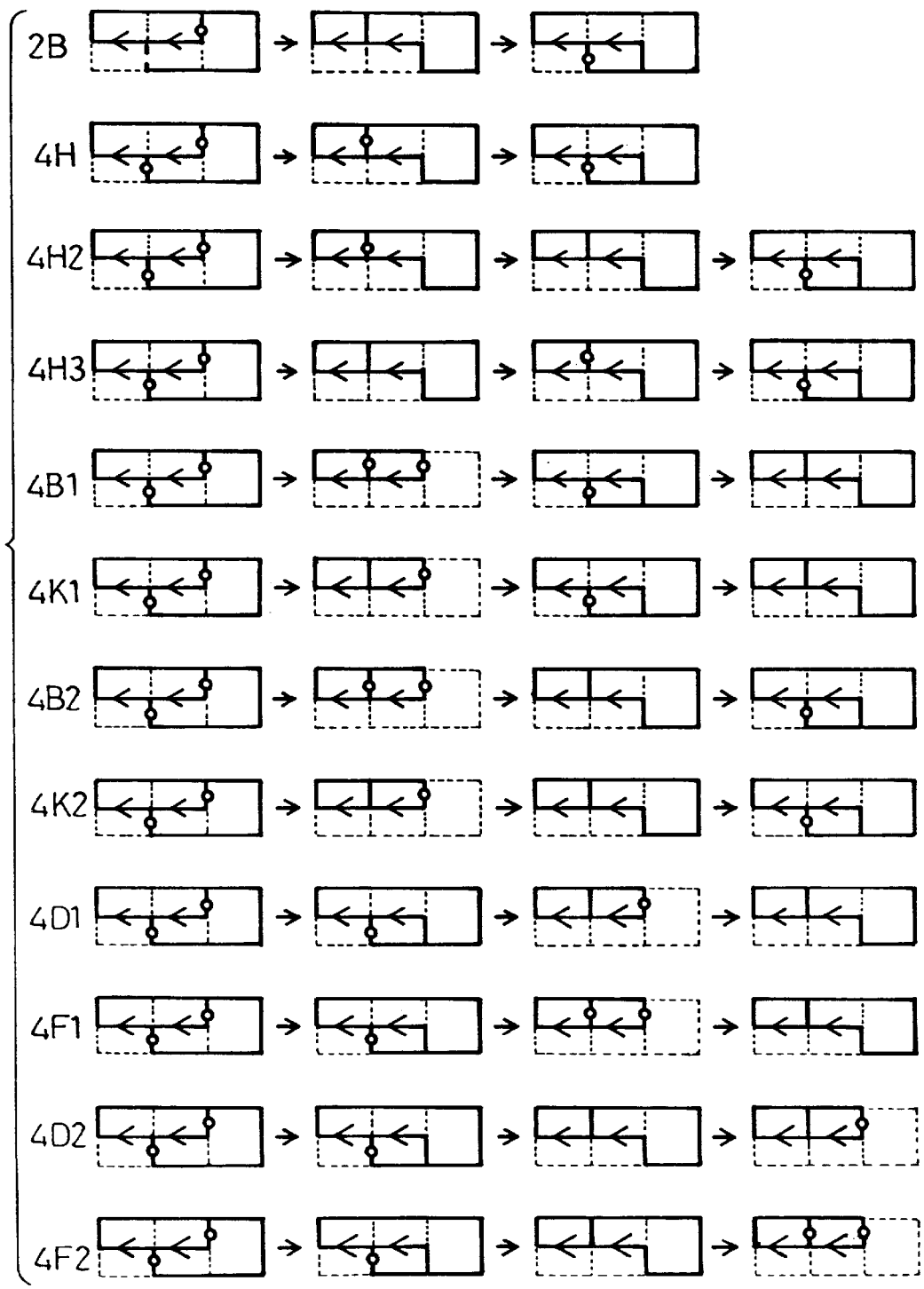
Figure 18:
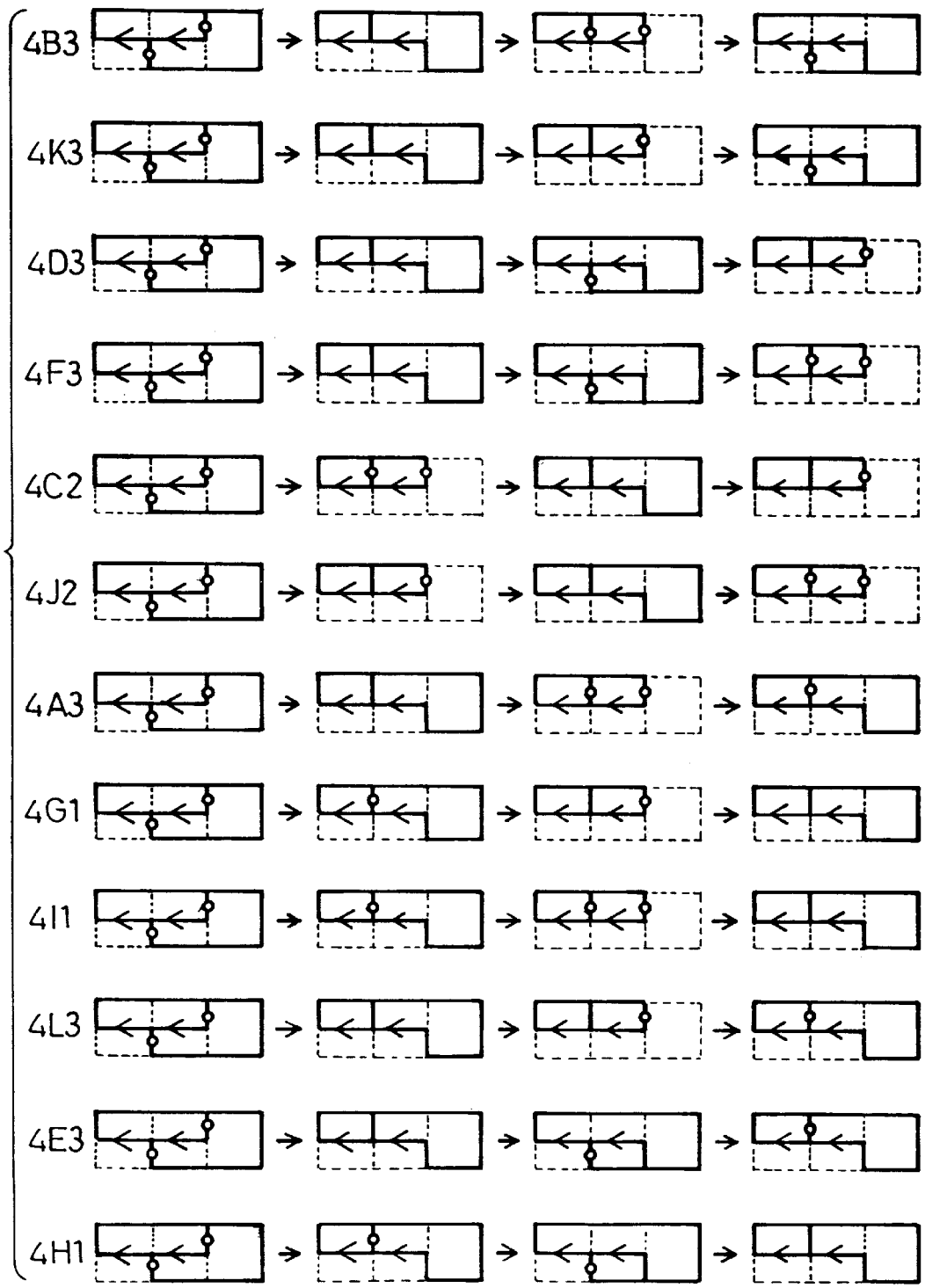
FIG. 18 is an explanatory diagram showing a fifth group of working aspects relative to still another switching operation in the present invention.

Respective working aspects (α1)–(α3) and (β1)–(β6) enumerated in the followings with the foregoing definition made as the premise are corresponding to such current loops as shown in FIG. 12, and respective working aspects (γ1)–(γ6) and (γ1)–(γ6) are corresponding to such current loops as shown in FIG. 13. In the following description, further, a term "when the polarity of the power source is negative" means "when the polarity of the power source on the side of the junction point of the first and second switching elements Q1 and Q2 is negative", whereas a term "when the polarity of the power source is positive" means that "when the polarity of the power source on the side of the junction point of the first and second switching elements Q1 and Q2 is positive". The working aspects provided with respective control devices in the followings are applicable to the circuit of FIG. 1 and to the circuit of FIG. 11.

(α1) A working aspect provided with a control device formed to operate in the order of [A1]→[B1] when the polarity of the power source is negative, but in the order of [A2]→[B2] when the polarity of the power source is positive.

(α2) A working aspect provided with a control device formed to operate in the order [A1]→[C1] when the polarity of the power source is negative, but in the order of [A2]→[C2] when the polarity of the power source is positive.

(α3) A working aspect provided with a control device formed to operate in the order of [A1]→[D1] when the polarity of the power source is negative, but in the order of [A2]→[D2] when the polarity of the power source is positive.

(β1) A working aspect provided with a control device formed to operate in the order of [A1]→[B1]→[C1] when the polarity of the power source is negative, but in the order of [A2]→[B2]→[C2] when the polarity of the power source is positive.

(β2) A working aspect provided with a control device formed to operate in the order of [A1]→[B1]→[D1] when the polarity of the power source is negative, but in the order of [A2]→[B2]→[D2] when the polarity of the power source is positive.

(β3) A working aspect provided with a control device formed to operate in the order of [A1]→[C1]→[B1] when the polarity of the power source is negative, but in the order of [A2]→[C2]→[B2] when the polarity of the power source is positive.

(β4) A working aspect provided with a control device formed to operate in the order of [A1]→[C1]→[D1] when the power source polarity is negative, but in the order of [A2]→[C2]→[D2] when the power source polarity is positive.

(β5) A working aspect provided with a control device formed to operate in the order of [A1]→[D1]→[B1] when the power source polarity is negative, but in the order of [A2]→[D2]→[B2] when the power source polarity is positive.

(β6) A working aspect provided with a control device formed to operate in the order of [A1]→[D1]→[C1] when the power source polarity is negative, but in the order of [A2]→[D2]→[C2] when the power source polarity is positive.

(γ1) A working aspect provided with a control device formed to operate in the order of [A1]→[B1]→[C1]→[D1] when the power source polarity is negative, but in the order of [A2]→[B2]→[C2]→[D2] when the power source polarity is positive.

(γ2) A working aspect provided with a control device formed to operate in the order of [A1]→[B1]→[D1]→[C1] when the power source polarity is negative, but in the order of [A2]→[B2]→[D2]→[C2] when the power source polarity is positive.

(γ3) A working aspect provided with a control device formed to operate in the order of [A1]→[C1]→[B1]→[D1] when the power source polarity is negative, but in the order of [A2→[C2]→[B2]→[D2] when the power source polarity is positive.

(γ4) A working aspect provided with a control device formed to operate in the order of [A1]→[C1]→[D1]→[B1] when the power source polarity is negative, but in the order of [A2]→[C2]→[D2]→[B2] when the power source polarity is positive.

(γ5) A working aspect provided with a control device formed to operate in the order of [A1]→[D1]→[B1]→C1] when the power source polarity is negative, but in the order of [A2]→[D2]→[B2]→[C2] when the power source polarity is positive.

(γ6) A working aspect provided with a control device formed to operate in the order of [A1]→[D1]→[C1]→[B1] when the power source polarity is negative, but in the order of [A2]→[D2]→[C2]→[B2] when the power source polarity is positive.

(δ1) A working aspect provided with a control device formed to operate in the order of [A1]→[B1]→[C1]→[B2] when the power source polarity is negative, but in the order of [A2]→[B2]→[C2]→[B2] when the power source polarity is positive.

(δ2) A working aspect provided with a control device formed to operate in the order of [A1]→[B1]→[D1]→[B1] when the power source polarity is negative, but in the order of [A2]→[B2]→[D2]→[B2] when the power source polarity is positive.

(δ3) A working aspect provided with a control device formed to operate in the order of [A1]→[C1]→[[B1]→C1] when the power source polarity is negative, but in the order of [A2]→[C2]→[B2]→[C2] when the power source polarity is positive.

(δ4) A working aspect provided with a control device formed to operate in the order of [A1]→[C1]→[D1]→[C1]

when the power source polarity is negative, but in the order of [A2]→[C2]→[D2]→[C2] when the power source polarity is positive.

(δ5) A working aspect provided with a control device formed to operate in the order of [A1]→[D1]→[B1]→[D1] when the power source polarity is negative, but in the order of [A2]→[D2]→[B2]→[D2] when the power source polarity is positive.

(δ6) A working aspect provided with a control device formed to operate in the order of [A1]→[D1]→[C1]→[D1] when the power source polarity is negative, but in the order of [A2]→[D2]→[C2]→[D2] when the power source polarity is positive.

Next, preferable working aspects shall be enumerated in the followings with respect to concrete switching procedure, while, prior to that, the definition of generally used switching term hereinafter repeatedly referred to shall be preliminarily described.

a1) A term in which the second and third field effect transistors Q1 and Q3 are made ON. In the following description, this term shall be referred to simply as [a1].

a2) A term in which the first and fourth field effect transistors Q1 and Q4 are made ON. In the following description, this term shall be referred to simply as [a2].

b1) A term in which the first and third field effect transistors Q2 and Q3 are made ON. In the following description, this term shall be referred to simply as [b1].

b2) A term in which the second and fourth field effect transistors Q2 and Q4 are made ON. In the following description, this term shall be referred to simply as [b2].

c1) A term in which the first field effect transistor Q1 is made ON. In the following description, this term shall be referred to simply as [c1].

c2) A term in which the second field effect transistor Q2 is made ON. In the following description, this term shall be referred to simply as [c2].

d1) A term in which the second field effect transistor Q2 is made ON. In the following description, this term shall be referred to simply as [d1].

d2) A term in which the first field effect transistor Q1 is made ON. In the following description, this term shall be referred to simply as [d2].

e1) A term in which the third field effect transistor Q3 is made ON. In the following description, this term shall be referred to simply as [e1].

e2) A term in which the fourth field effect transistor Q4 is made ON. In the following description, this term shall be referred to simply as [e2].

f) A term in which the first to fourth field effect transistors Q1–Q4 are made OFF. In the following description, this term shall be referred to simply as [f].

With the foregoing definition made as a premise, respective working aspects enumerated in the followings correspond to FIGS. 14–18. Also in the following description, the term "when the power source polarity is negative" should mean "when the polarity of the power source on the side of the junction point of the first and second switching elements is negative", and the term "when the power source polarity is positive" should mean "when the polarity of the power source on the side of the junction point of the first and second switching elements is positive". Further, the working aspects provided with each of following control devices are also applicable to the circuit of either FIG. 1 or FIG. 11.

(3A) A working aspect provided with a control device formed to operate in the order to [a1]→[e1] when the power source polarity is negative, but in the order of [a2]→[e2] when the power source polarity is positive.

(3B) A working aspect provided with a control device formed to operate in the order of [a1]→[b1] when the power source polarity is negative, but in the order of [a2]→[b2] when the power source polarity is positive.

(4C) A working aspect provided with a control device formed to operate in the order of [a1]→[b1]→[e1] when the power source voltage is negative, but in the order of [a2]→[b2]→[e2] when the power source polarity is positive.

(4J) A working aspect provided with a control device formed to operate in the order of [a1]→[e1]→[b1] when the power source polarity is negative, but in the order of [a2]→[e2]→[b2] when the power source polarity is positive.

(1) A working aspect provided with a control device formed to operate in the order of [a1]→[f] when the power source polarity is negative, but in the order of [a2]→[f] when the power source polarity is positive.

(3C) A working aspect provided with a control device formed to operate in the order of [a1]→[c1] when the power source polarity is negative, but in the order of [a2]→[c2] when the power source polarity is positive.

(3C') A working aspect provided with a control device formed to operate in the order of [a1]→[c1]→[f] when the power source polarity is negative, but in the order of [a2]→[c2]→[f] when the power source polarity is positive.

(3C") A working aspect provided with a control device formed to operate in the order of [a1]→[f]→[c1] when the power source polarity is negative, but in the order of [a2]→[f]→[c2] when the power source polarity is positive.

(4B) A working aspect provided with a control device formed to operate in the order of [a1]→[b1]→[d1] when the power source polarity is negative, but in the order of [a2]→[b2]→[d2] when the power source polarity is positive.

(4K) A working aspect provided with a control device formed to operate in the order of [a1]→[e1]→[d1] when the power source polarity is negative but in the order of [a2]→[e2]→[d2] when the power source polarity is positive.

(3A') A working aspect provided with a control device formed to operate in the order of [a1]→[e1]→[f] when the power source polarity is negative, but in the order of [a2]→[e2]→[f] when the power source polarity is positive.

(3B') A working aspect provided with a control device formed to operate in the order of [a1]→[b1]→[f] when the power source polarity is negative, but in the order of [a2]→[b2]→[f] when the power source polarity is positive.

(4A) A working aspect provided with a control device formed to operate in the order of [a1]→[b1]→[c1] when the power source polarity is negative, but in the order of [a2]→[b2]→[c2] when the power source polarity is positive.

(4L) A working aspect provided with a control device formed to operate in the order of [a1]→[e1]→[c1] when the power source polarity is negative, but in the order of [a2]→[e2]→[c2] when the power source polarity is positive.

(4A1) A working aspect provided with a control device formed to operate in the order of [a1][→b1]→[c1]→[f] when the power source polarity is negative, but in the order of [a2]→[b2]→[c2]→[f] when the power source polarity is positive.

(4A2) A working aspect provided with a control device formed to operate in the order of [a1]→[b1]→[f]→[c1] when the power source polarity is negative, but in the order of [a2]→[b2]→[f]→[C2] when the power source polarity is positive.

(4C1) A working aspect provided with a control device formed to operate in the order of [a1]→[b1]→[e1]→[f] when the power source polarity is negative, but in the order of [a2]→[b2]→[e2]→[f] when the power source polarity is positive.

(4J1) A working aspect provided with a control device formed to operate in the order of [a1]→[e1]→[b1]→[f] when the power source polarity is negative, but in the order of [a2]→[e2]→[b2]→[f] when the power source polarity is positive.

(4L1) A working aspect provided with a control device formed to operate in the order of [a1]→[e1]→[c1]→[f] when the power source polarity is negative, but in the order of [a2]→[e2]→[b2]→[f] when the power source polarity is positive.

(4L2) A working aspect provided with a control device formed to operate in the order of [a1]→[e1]→[f]→[c1] when the power source polarity is negative, but in the order of [a2]→[e2]→[f]→[c2] when the power source polarity is positive.

(4D) A working aspect provided with a control device formed to operate in the order of [a1]→[d1]→[e1] when the power source polarity is negative, but in the order of [a2]→[d2]→[e2] when the power source polarity is positive.

(4F) A working aspect provided with a control device formed to operate in the order of [a1]→[d1]→[e1] when the power source polarity is negative, but in the order of [a2]→[d2]→[e2] when the power source polarity is positive.

(2A) A working aspect provided with a control device formed to operate in the order of [a1]→[d1]→[f] when the power source polarity is negative, but in the order of [a2]→[d2]→[f] when the power source polarity is positive.

(4E) A working aspect provided with a control device formed to operate in the order of [a1]→[d1]→[c1] when the power source polarity is negative, but in the order of [a2]→[d2]→[c2] when the power source polarity is positive.

(4E1) A working aspect provided with a control device formed to operate in the order of [a1]→[d1]→[c1]→[f] when the power source polarity is negative, but in the order of [a2]→[d2]→[c2]→[f] when the power source polarity is positive.

(4E2) A working aspect provided with a control device formed to operate in the order of [a1]→[d1]→[f]→[c1] when the power source polarity is negative, but in the order of [a2]→[d2]→[f]→[c2] when the power source polarity is positive.

(3A") A working aspect provided with a control device formed to operate in the order of [a1]→[f]→[e1] when the power source polarity is negative, but in the order of [a2]→[f]→[e2] when the power source polarity is positive.

(3B") A working aspect provided with a control device formed to operate in the order of [a1]→[f]→[b1] when the power source polarity is negative, but in the order of [a2]→[f]→[b2] when the power source polarity is positive.

(4G) A working aspect provided with a control device formed to operate in the order of [a1]→[c1]→[e1] when the power source polarity is negative, but in the order of [a2]→[c2]→[e2] when the power source polarity is positive.

(4I) A working aspect provided with a control device formed to operate in the order of [a1]→[c1]→[b1] when the power source polarity is negative, but in the order of [a2]→[c2]→[b2] when the power source polarity is positive.

(4C3) A working aspect provided with a control device formed to operate in the order of [a1]→[f]→[b1]→[e1] when the power source polarity is negative, but in the order of [a2]→[f]→[b2]→[e2] when the power source polarity is positive.

(4G2) A working aspect provided with a control device formed to operate in the order of [a1]→[c1]→[f]→[e1] when the power source polarity is negative, but in the order of [a2]→[c2]→[f]→[e2] when the power source polarity is positive.

(4G3) A working aspect provided with a control device formed to operate in the order of [a1]→[f]→[c1]→[e1] when the power source polarity is negative, but in the order of [a2]→[f]→[c2]→[e2] when the power source polarity is positive.

(4I2) A working aspect provided with a control device formed to operate in the order of [a1]→[c1]→[f]→[b1] when the power source polarity is negative, but in the order of [a2]→[c2]→[f]→[b2] when the power source polarity is positive.

(4I3) A working aspect provided with a control device formed to operate in the order of [a1]→[f]→[c1]→[b1] when the power source polarity is negative, but in the order of [a2]→[f]→[c2]→[b2] when the power source polarity is positive.

(4J3) A working aspect provided with a control device formed to operate in the order of [a1]→[f]→[e1]→[b1] when the power source polarity is negative, but in the order of [a2]→[f]→[e2]→[b2] when the power source polarity is positive.

(2B) A working aspect provided with a control device formed to operate in the order of [a1]→[f]→[d1] when the power source polarity is negative, but in the order of [a2]→[f]→[d2] when the power source polarity is positive.

(4H) A working aspect provided with a control device formed to operate in the order of [a1]→[c1]→[d1] when the power source polarity is negative, but in the order of [a2]→[c2]→[d2] when the power source polarity is positive.

(4H2) A working aspect provided with a control device formed to operate in the order of [a1]→[c1]→[f]→[d1] when the power source polarity is negative, but in the order of [a2]→[c2]→[f]→[d2] when the power source polarity is positive.

(4H3) A working aspect provided with a control device formed to operate in the order of [a1]→[f]→[c1]→[d1] when the power source polarity is negative, but in the order of [a2]→[f]→[c2]→[d2] when the power source polarity is positive.

(4B1) A working aspect provided with a control device formed to operate in the order of [a1]→[b1]→[d1]→[f] when the power source polarity is negative, but in the order of [a2]→[b2]→[d2]→[f] when the power source polarity is positive.

(4K1) A working aspect provided with a control device formed to operate in the order of [a1]→[e1]→[d1]→[f] when the power source polarity is negative, but in the order of [a2]→[e2]→[d2]→[f] when the power source polarity is positive.

(4B2) A working aspect provided with a control device formed to operate in the order of [a1]→[b1]→[f]→[d1] when the power source polarity is negative, but in the order of [a2]→[b2]→[f]→[d2] when the power source polarity is positive.

(4K2) A working aspect provided with a control device formed to operate in the order of [a1]→[e1]→[f]→[d1] when the power source polarity is negative, but in the order of [a2]→[e2]→[f]→[d2] when the power source polarity is positive.

(4D1) A working aspect provided with a control device formed to operate in the order of [a1]→[d1]→[e1]→[f]

when the power source polarity is negative, but in the order of [a2]→[d2]→[e2]→[f] when the power source polarity is positive.

(4F1) A working aspect provided with a control device formed to operate in the order of [a1]→[d1]→[b1]→[f] when the power source polarity is negative, but in the order of [a2]→[d2]→[b2]→[f] when the power source polarity is positive.

(4D2) A working aspect provided with a control device formed to operate in the order of [a1]→[d1]→[f]→[e1] when the power source polarity is negative, but in the order of [a2]→[d2]→[f]→[e2] when the power source polarity is positive.

(4F2) A working aspect provided with a control device formed to operate in the order of [a1]→[d1]→[f]→[b1] when the power source polarity is negative, but in the order of [a2]→[d2]→[f]→[b2] when the power source polarity is positive.

(4B3) A working aspect provided with a control device formed to operate in the order of [a1]→[f]→[b1]→[d1] when the power source polarity is negative, but in the order of [a2]→[f]→[b2]→[d2] when the power source polarity is positive.

(4K3) A working aspect provided with a control device formed to operate in the order of [a1]→[f]→[e1]→[d1] when the power source polarity is negative, but in the order of [a2]→[f]→[e2]→[d2] when the power source polarity is positive.

(4D3) A working aspect provided with a control device formed to operate in the order of [a1]→[f]→[d1]→[e1] when the power source polarity is negative, but in the order of [a2]→[f]→[d2]→[e2] when the power source polarity is positive.

(4F3) A working aspect provided with a control device formed to operate in the order of [a1]→[f]→[d1]→[b1] when the power source polarity is negative, but in the order of [a2]→[f]→[d2]→[b2] when the power source polarity is positive.

(4C2) A working aspect provided with a control device formed to operate in the order of [a1]→[b1]→[f]→[e1] when the power source polarity is negative, but in the order of [a2]→[b2]→[f]→[e2] when the power source polarity is positive.

(4J2) A working aspect provided with a control device formed to operate in the order of [a1]→[e1]→[f]→[b1] when the power source polarity is negative, but in the order of [a2]→[e2]→[f]→[b2] when the power source polarity is positive.

(4A3) A working aspect provided with a control device formed to operate in the order of [a1]→[f]→[b1]→[c1] when the power source polarity is negative, but in the order of [a2]→[f]→[b2]→[c2] when the power source polarity is positive.

(4G1) A working aspect provided with a control device formed to operate in the order of [a1]→[c1]→[e1]→[f] when the power source polarity is negative, but in the order of [a2][c2]→[e2]→[f] when the power source polarity is positive.

(4I1) A working aspect provided with a control device formed to operate in the order of [a1]→[c1]→[b1]→[f] when the power source polarity is negative, but in the order of [a2]b[c2]→[b2]→[f] when the power source polarity is positive.

(4L3) A working aspect provided with a control device formed to operate in the order of [a1]→[f][e1]→[c1] when the power source polarity is negative, but in the order of [a2]→[f]→[e2]→[c2] when the power source polarity is positive.

(4E3) A working aspect provided with a control device formed to operate in the order of [a1]→[f]→[d1]→[c1] when the power source polarity is negative, but in the order of [a2]→[f]→[d2]→[c2] when the power source polarity is positive.

(4H1) A working aspect provided with a control device formed to operate in the order of [a1]→[c1]→[d1]→[f] when the power source polarity is negative, but in the order of [a2]→[c2]→[d2]→[f] when the power source polarity is positive.

Further, in a period in which a current flows through the parasitic diode of the switching element Q when the power source polarity is negative, and in a period in which a current flows through the parasitic diode of the switching element Q3 when the power source polarity is positive, it may be possible to apply a voltage across the gate and source of the particular element.

In the respective foregoing working aspects, the output to the load should preferably be made in a square wave at a low frequency in synchronism with the power source. Further, while a discharge lamp can be used as the load, it should not be limited thereto.

Embodiment 1

Figure 2A:
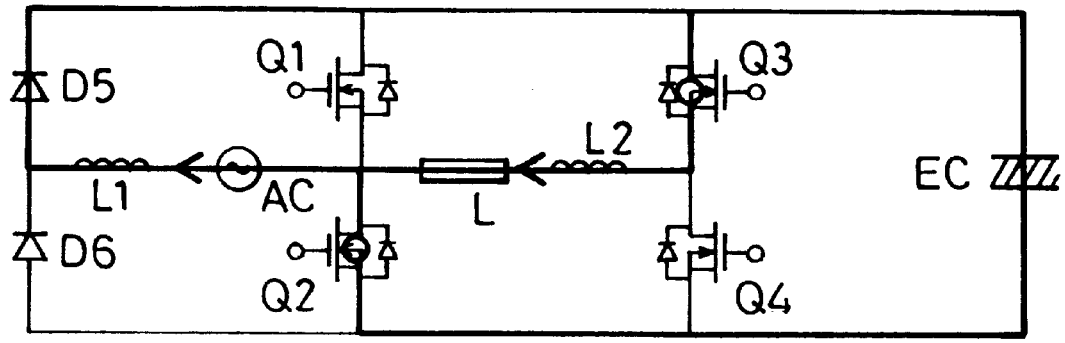
FIGS. 2a–2c are explanatory circuit diagrams showing the operation in one of polarities of the power source in one concrete embodiment according to the present invention.
Figure 2B:
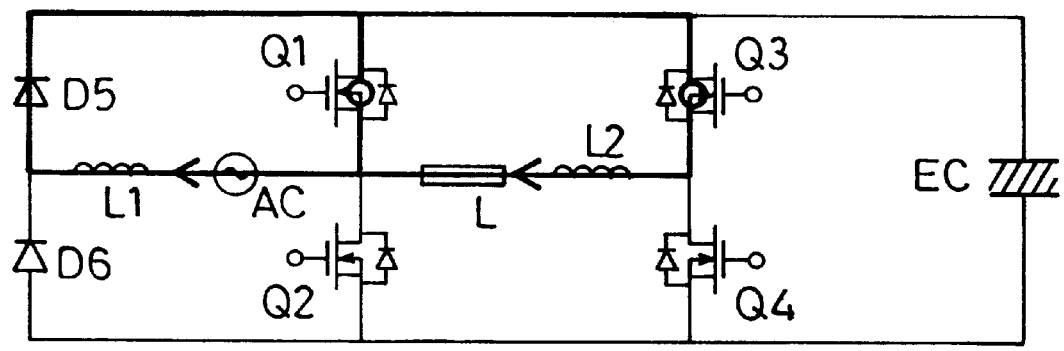
Figure 2C:
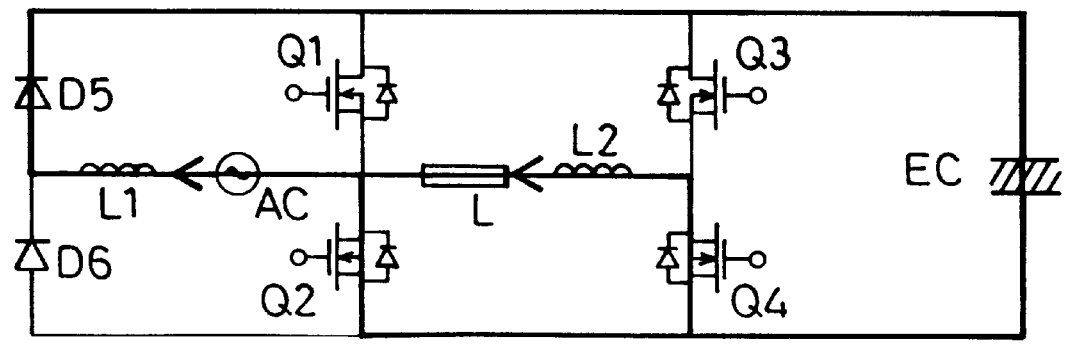

While a first embodiment is shown in FIG. 2 with FIG. 1 made as the basic formation, this power source device is formed such that the series connection of first and second field effect transistors Q1 and Q2, the series connection of third and fourth field effect transistors Q3 and Q4 and the series connection of two rectifying elements D5 and D6 are connected in parallel with the capacitor EC; the series circuit of the power source AC and first inductor L1 connected through a filter not shown is connected between the junction point of the first and second field effect transistors Q1 and Q2 and the junction point of the two rectifying elements D5 and D6; and the series circuit of the load circuit L and second inductor L2 is connected between the junction point of the first and second field effect transistors Q1 and Q2 and the junction point of the third and fourth field effect transistors Q3 and Q4. One end of the power source AC is connected to coincide with the junction point of the first and second field effect transistors Q1 and Q2, and one end of the load circuit L is connected to coincide with the junction of the first and second field effect transistors Q1 and Q2.

Figure 3A:
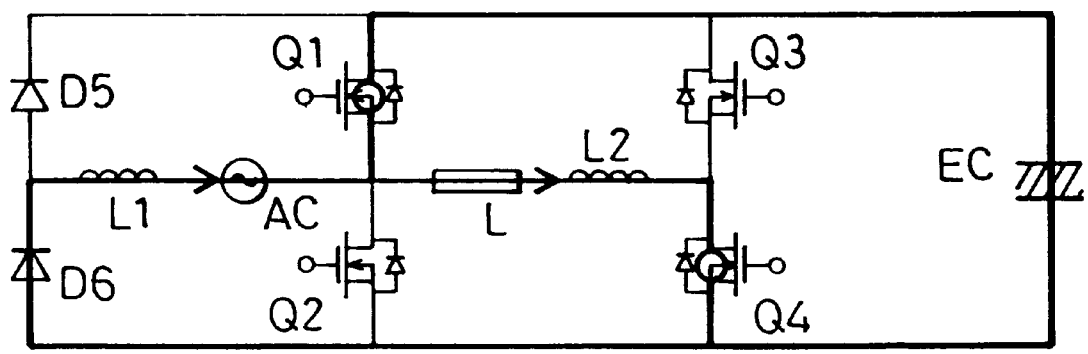
FIGS. 3a–3c are circuit diagrams showing an operation in the other power source polarity in the embodiment of FIGS. 2a–2c.
Figure 3B:
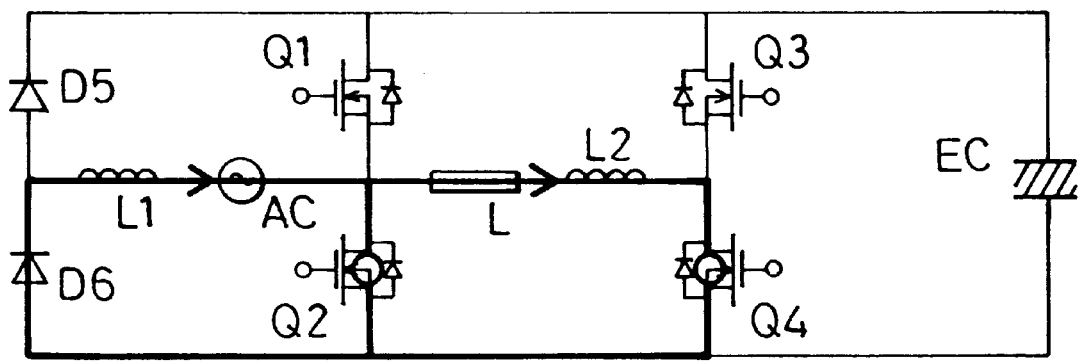
Figure 3C:
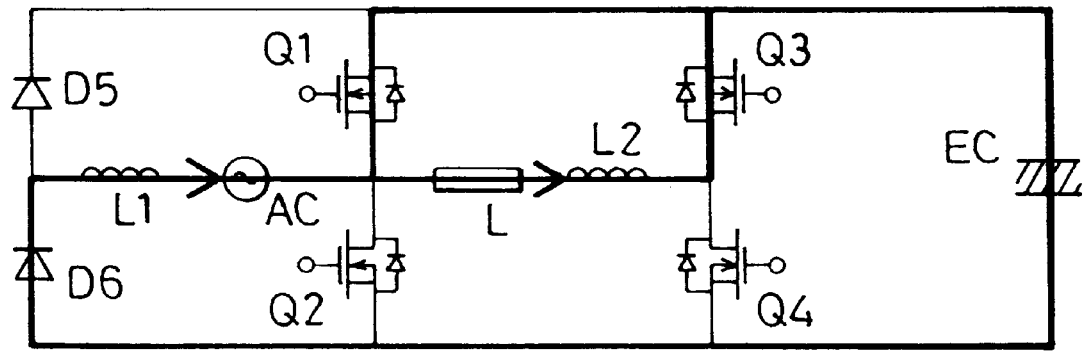

The respective field effect transistors Q1–Q4 are driven for their switching as in the followings, by means of ON/OFF signals given by the control device. There is provided a control device CNT formed to operate, when the polarity of the power source AC is negative on the side of the junction point of the first and second field effect transistors Q1 and Q2, in the order of a period in which the second and third field effect transistors Q2 and Q3 are made ON (see FIG. 2a), a period in which the first and third field effect transistors Q1 and Q3 are made ON (see FIG. 2b), and a period in which the first, second, third and fourth field effect transistors Q1, Q2, Q3 and Q4 are made OFF (see FIG. 2c), and to operate, when the polarity of the power source AC is positive on the side of the junction point of the first and second field effect transistors Q1 and Q2, in the order of a period in which the first and fourth field effect transistors Q1 and Q4 are made ON (see FIG. 3a), a period in which the second and fourth field effect transistors Q2 and Q4 are made ON (see FIG. 3b), and a period in which the first, second, third and fourth field effect transistors Q1, Q2, Q3 and Q4 are made OFF (see FIG. 3c).

This power source device comprises a first power converting circuit forming a boost converter and a second power converting circuit forming a buck converter, and the first and second field effect transistors Q1 and Q2 are used in common in the first and second power converting circuits. The operation at the time when the polarity of the power source AC is negative on the side of the junction point of the first and second field effect transistors Q1 and Q2 are shown in FIG. 2 shall be described with reference to the first power converting circuit forming the boost converter and the second power converting circuit forming the buck converter.

Referring first to the first power converting circuit which forming the boost converter, the period in which the first and third field effect transistors Q1 and Q3 are made ON (see FIG. 2b) is a period in which an energy is charged in the first inductor L1 which acts as a choke in the boosting chopper, while the period in which the first through fourth field effect transistors Q1 through Q4 are made OFF (see FIG. 2c) as well as the period in which the second and third field effect transistors Q2 and Q3 are made ON (see FIG. 2a) are periods in which the energy stored in the first inductor L1 is discharged.

Referring next to the second power converting circuit which forming the buck converter, the period in which the second and third field effect transistors Q2 and Q3 are made ON (see FIG. 2a) is a period in which an energy is charged in the second inductor L2 which acts as a choke in the buck, while the period in which the first and third field effect transistors Q1 and Q3 are made ON (see FIG. 2b) and the period in which the first through fourth field effect transistors Q1 through Q4 are made OFF (see FIG. 2c) are periods in which the energy stored in the second inductor L2 is discharged.

Referring to these respects from the viewpoint of current loop, the period in which the second and third field effect transistors Q2 and Q3 are made ON (FIG. 2a) is a term (which shall be referred to as T1) in which a state at which a current of the first power converting circuit CNV1 forms a closed loop comprising the first inductor L1, first rectifying element D5, capacitor EC, second field effect transistor Q2 and power source AC, and a state at which a current of the second power converting circuit CNV2 forms a closed loop comprising the capacitor EC, third field effect transistor Q3, second inductor L2, load circuit L and second field effect transistor Q2 are concurrently existing. Further, the period in which the first and third field effect transistors Q1 and Q3 are made ON (FIG. 2b) is a term (which term shall be referred to as T2) in which a state at which the current of the first power converting circuit CNV1 forms a closed loop comprising the power source AC, first inductor L1, first rectifying element D5 and first field effect transistor Q1, and a state at which the current of the second power converting circuit CNV2 forms a closed loop comprising the second inductor L2, load circuit L, first field effect transistor Q1 and third field effect transistor Q3 are concurrently existing. Further, the period in which the first through fourth field effect transistors Q1 through Q4 are made OFF (FIG. 2c) is a term (which term shall be referred to as T3) in which a state at which the current of the first power converting circuit CNV1 forms a closed loop comprising the first inductor L1, first rectifying element D5, capacitor EC, second field effect transistor Q2 and power source AC, and a state at which the current of the second power converting circuit CNV2 forms a closed loop comprising the second inductor L2, load circuit L, second field effect transistor Q2 and fourth field effect transistor Q4 are concurrently existing.

In the term T1, an effect is realized in that the current flowing through the second field effect transistor Q2 is reduced to decrease any switching loss, since the forward directional current caused by the second power converting circuit CNV2 and the backward directional current by the first power converting circuit CNV1 to flow to the second field effect transistor Q2 are superposed.

In the term T2, an effect is realized in that the current flowing through the first field effect transistor Q1 is decreased to reduce any switching loss, since the forward directional current caused by the first power converting circuit CNV1 and the backward current by the second power converting circuit CNV2 to flow to the first field effect transistor Q1 are superposed.

In the term T3, an effect is realized in that the current flowing through the second field effect transistor Q2 is decreased to reduce any switching loss, since the forward directional current caused by the second power converting circuit CNV2 and the backward directional current by the first power converting circuit CNV1 to flow to the second field effect transistor Q2 are superposed.

Figure 4:
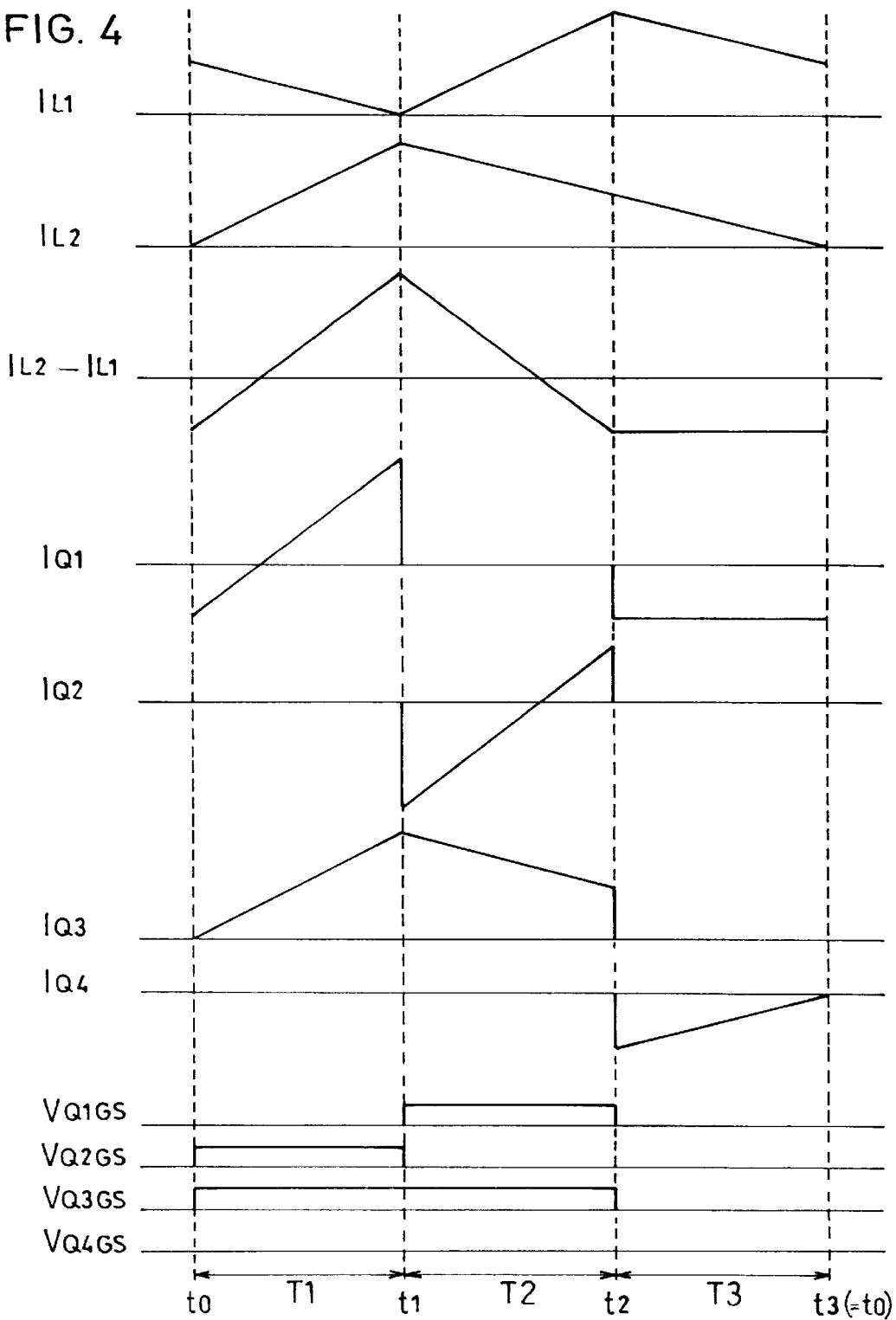
FIG. 4 is an operational waveform diagram at respective parts in the embodiment of FIGS. 2a–2c, FIGS. 5a–5d are circuit diagrams showing an operation in one power source polarity of another embodiment of the present invention.
Figure 5A:
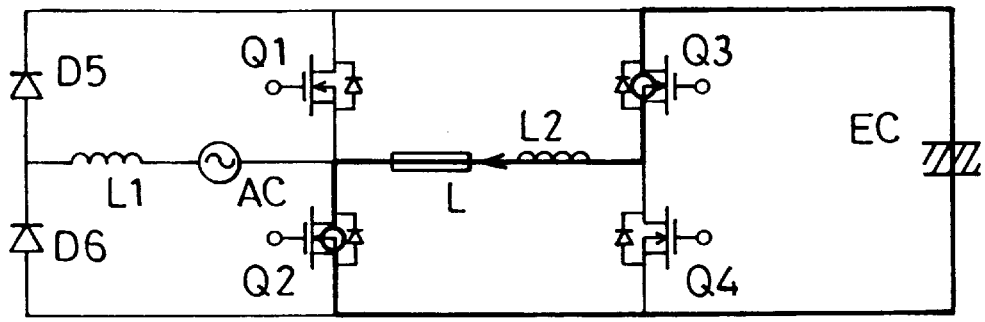
Figure 5B:
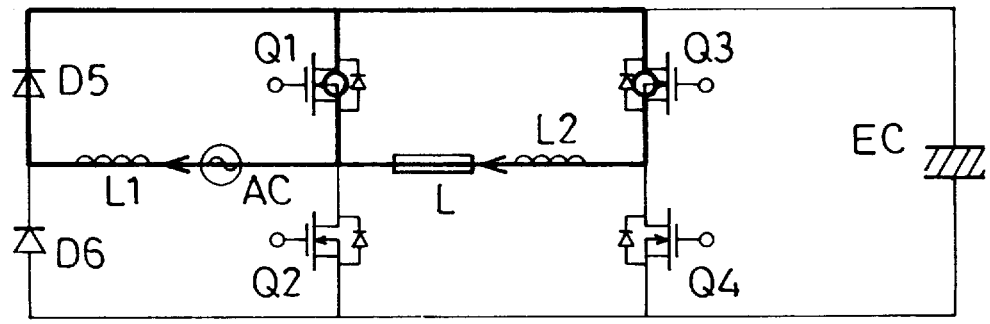
Figure 5C:
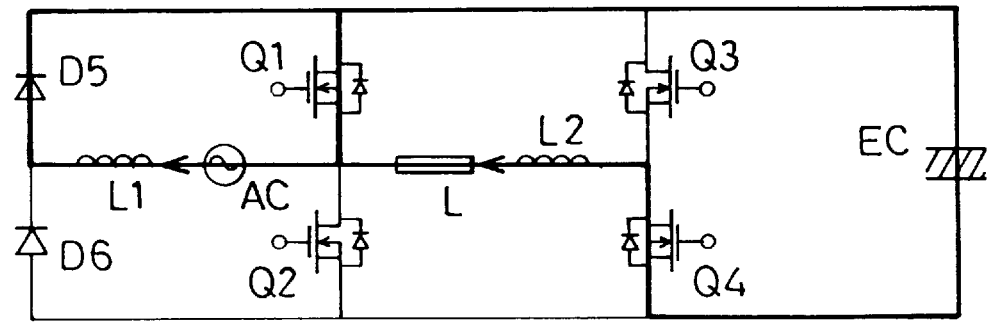
Figure 5D:
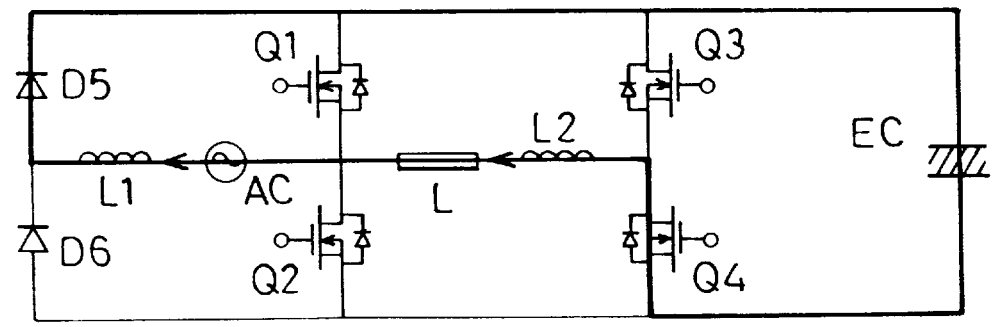
Figure 6A:
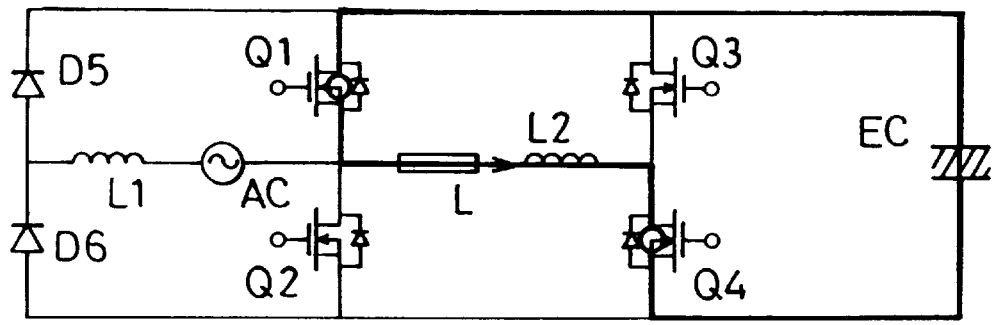
FIGS. 6a–6d are circuit diagrams showing an operation in the other power source polarity of the embodiment of FIGS. 5a–5d.
Figure 6B:
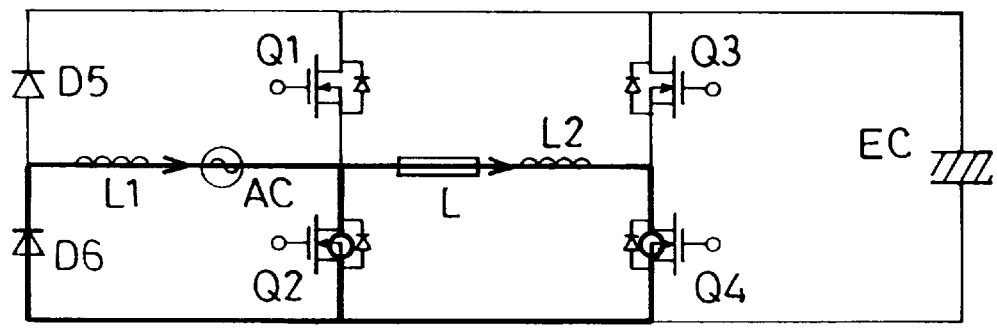
Figure 6C:
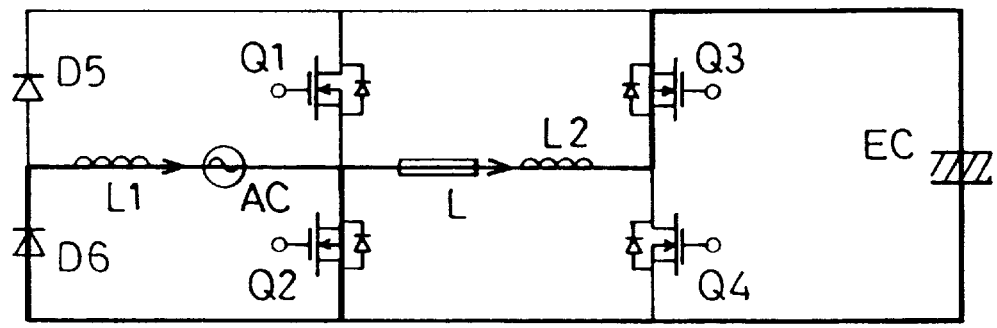
Figure 6D:
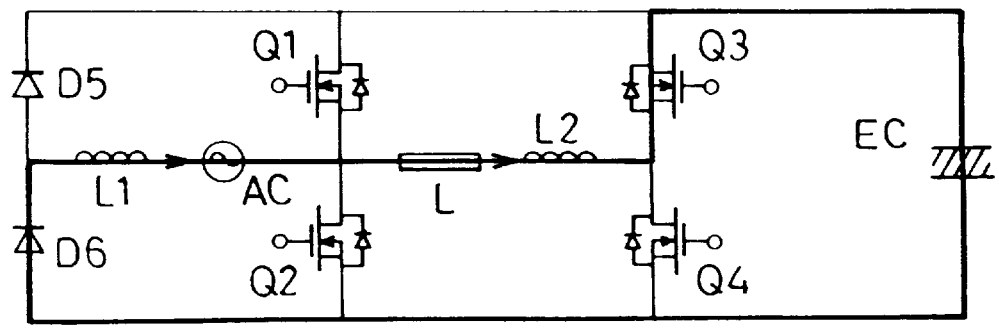

The operation in an event where the polarity of the power source AC is inverse is shown in FIG. 3. Further, waveforms at respective parts are shown in FIG. 4, in which there are shown a current IL1 flowing to the first inductor L1, a current IL2 to the second inductor L2, a difference IL2–IL1 between the current to the second inductor L2 and the current to the first inductor L1, a current IQ1 to the first field effect transistor Q1, a current IQ2 to the second field effect transistor Q2, a current IQ3 to the third field effect transistor Q3, a current IQ4 to the fourth field effect transistor Q4, and drive signals VQ1GS–VQ4GS supplied across the gate and source of the respective first to fourth field effect transistors Q1–Q4. In FIG. 4, waveforms for each cycle of switching are shown, and periods t0–t1, t1–t2 and t2–t3 (=t0) are corresponding to the terms T1, T2 and T3, respectively.

Embodiment 2

As Embodiment 2, an operation in an event where the power source voltage is low or the first inductor L1 is large and so on shall be described. The circuit formation and switching operation are the same as in Embodiment 1, but the current loops are partly different. References shall be made to the current loops in the event where the polarity of the power source AC is negative on the side of the junction point of the first and second field effect transistors Q1 and Q2 as shown in FIG. 5. First, a period in which the second and third field effect transistors Q2 and Q3 are made ON (see FIG. 5a) is a term (which shall be referred to as T1) in which there exists a state at which the current of the second power converting circuit CNV2 forms a closed loop comprising the capacitor EC, third field effect transistor Q3, second inductor L2, load circuit L and second field effect transistor Q2. Next, a period in which the first and third field effect transistors Q1 and Q3 are made QN (see FIG. 5b) is a term (which shall be referred to as T2) in which there exist concurrently a state at which the current of the first power converting circuit forms a closed loop comprising the power source AC, first inductor L1, first rectifying element D5 and first field effect transistor Q1, and a state at which the current of the second power converting circuit forms a closed loop comprising the second inductor L2, load circuit L, first field effect transistor Q1 and third field effect transistor Q3. Further, a period in which the first through fourth field effect transistors Q1–Q4 are made OFF (see FIG. 5c or 5d) allows such two states as follows to exist, depending on the magnitude relationship between the current flowing to the first inductor L1 and the current flowing to the second inductor L2:

An event where the absolute value of the current to the first inductor L1 is smaller than the absolute value of the current to the second inductor L2 (see FIG. 5c) will be a term (which shall be referred to as T3) in which there exist concurrently a state at which the current of the first power converting circuit CNV1 forms a closed loop comprising the first inductor L1, first rectifying element D5 and first field effect transistor Q1, and a state at which the current of the second power converting circuit CNV2 forms a closed loop comprising the second inductor L2, load circuit L, first field effect transistor Q1, capacitor EC and fourth field effect transistor Q4. Further, upon coincidence of the absolute value of the current to the first inductor L1 with the absolute value of the current to the second inductor L2 (see FIG. 5d), the currents from the first and second power converting circuits CNV1 and CNV2 are mutually cancelled, as a result of which the sum total of the currents flowing to the switching elements used in common will be zero so that, practically, there is formed no closed loop of the current through the foregoing commonly-used switching elements in the respective power converting circuits, and it becomes a term (which shall be referred to as T4) in which there exists a state at which a closed loop comprising the first inductor L1, first rectifying element D5, capacitor EC, fourth field effect transistor Q4, second inductor L2, load circuit L and power source AC is formed.

Referring to the respective terms T1–T4 of the foregoing in relation to the first power converting circuit forming the boost converter and the second power converting circuit forming the buck converter, the terms T2 and T3 in relation to the first power converting circuit forming the boost converter are the terms for charging an energy in the first inductor L1 which acts as a choke of the boost, and the term T4 is the term for discharging the energy accumulated in the first inductor L1. Further, in relation to the second power converting circuit forming the buck converter, the term T1 is the term for charging an energy in the second inductor L2 acting as a choke in the buck, and the terms T2, T3 and T4 are the terms for discharging the energy accumulated in the second inductor L2.

In the term T2, the forward directional current caused by the first power converting circuit CNV1 and the backward directional current caused by the second power converting circuit CNV2 to flow to the first field effect transistor Q1 are mutually superposed, whereby the current flowing through the first field effect transistor Q1 is decreased, and an effect of reducing any power loss is realized.

In the term T3, the forward directional current caused by the second power converting circuit CNV2 and the backward directional current caused by the first power converting circuit CNV1 to flow to the second field effect transistor Q2 are mutually superposed, whereby the current flowing through the second field effect transistor Q2 is decreased, and an effect of reducing any power loss is realized.

In the term T4, the sum total of the currents flowing to the switching elements used in common is made zero as a result of the mutual cancellation of the currents from the first and second power converting circuits CNV1 and CNV2, there is formed no closed loop of the current through the switching elements used in common in the respective power converting circuits practically, so that, even though the power converting circuits are operating, there flows no current at all to the first and second field effect transistors Q1 and Q2, and an effect of causing no power loss to occur is realized.

Figure 7:
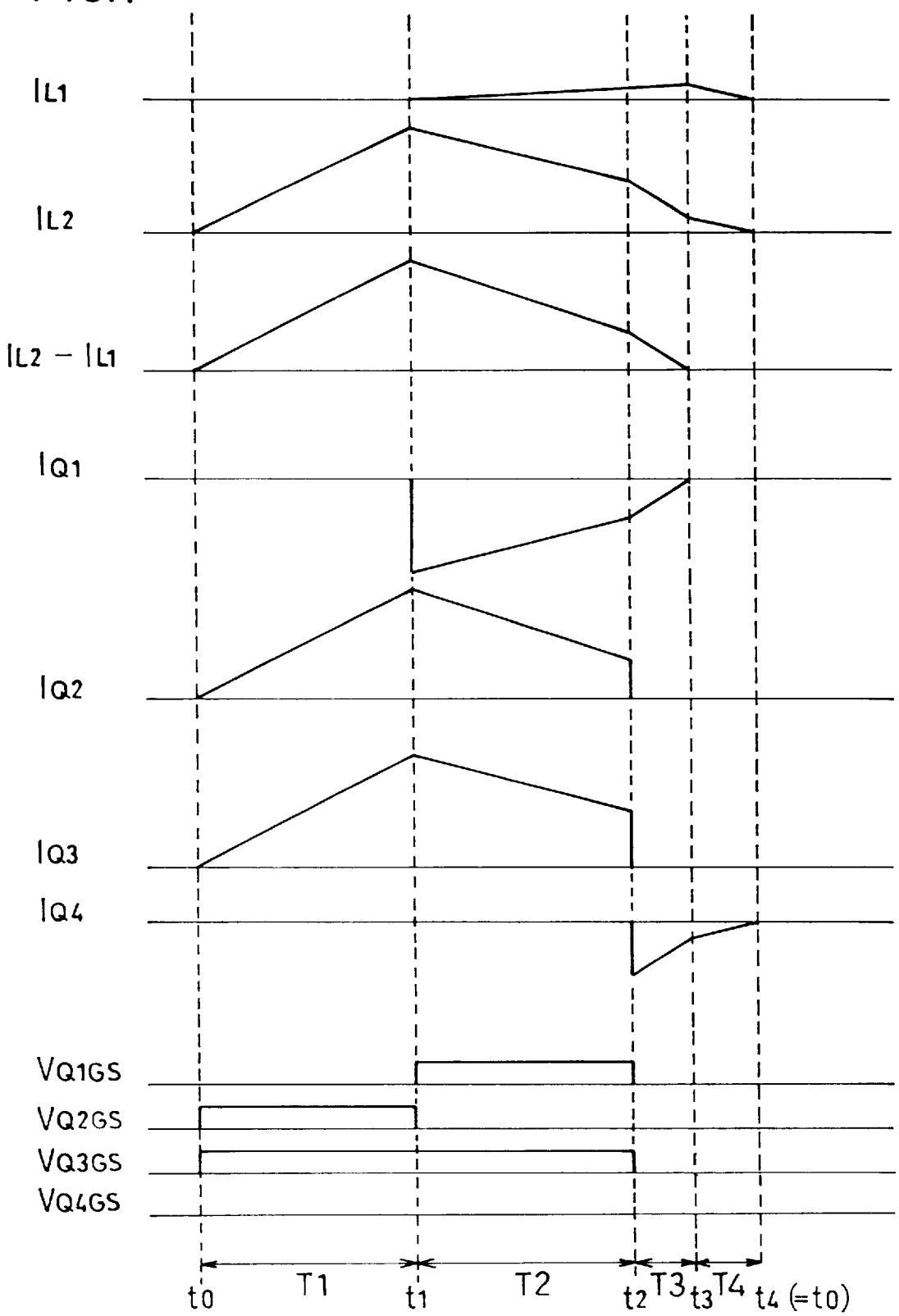
FIG. 7 is an operational waveform diagram at respective parts in the embodiment of FIGS. 5a–5d, FIGS. 8a–8d are circuit diagrams showing an operation in one power source polarity of still another embodiment according to the present invention.
Figure 8A:
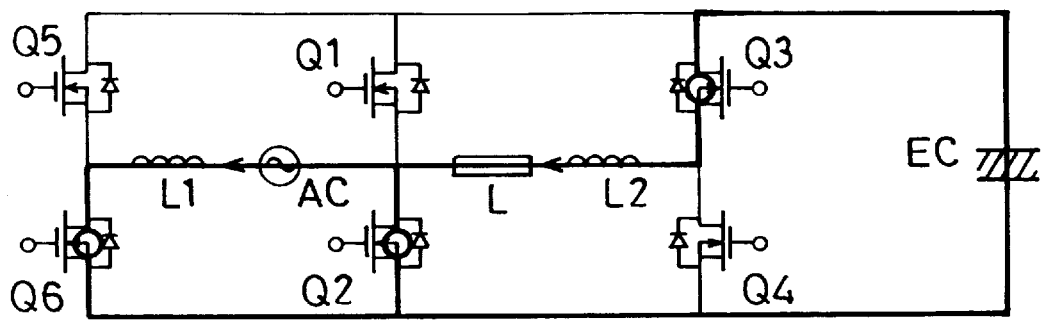
Figure 8B:
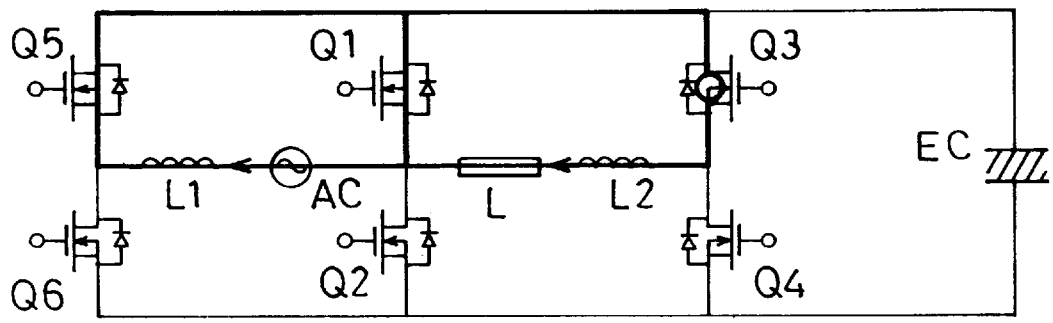
Figure 8C:
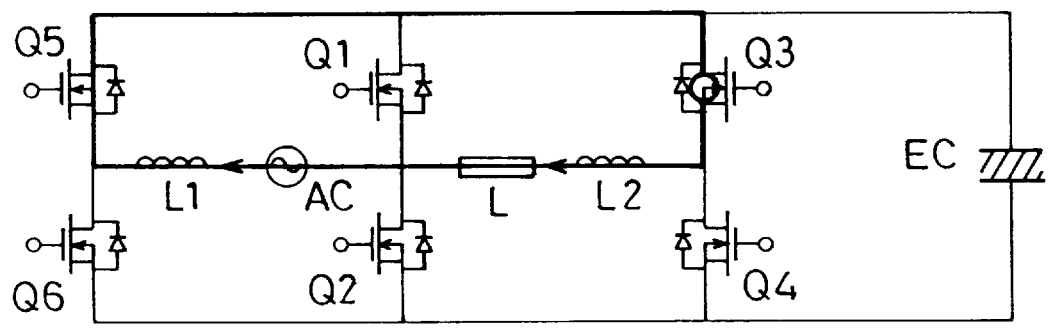
Figure 8D:
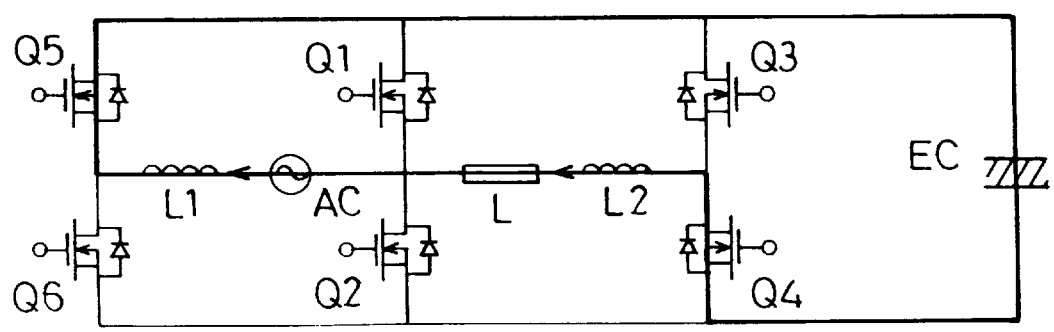

The operation in the event where the power source AC is of inverse polarity is shown in FIG. 6. Further, waveforms at respective parts are shown in FIG. 7, in which there are shown the current IL1 flowing to the first inductor L1, the current IL2 to the second inductor L2, a difference IL2–IL1 between the currents to the second and first inductors L2 and L1, the current IQ1 to first field effect transistor Q1, the current IQ2 to the second field effect transistor Q2, the current IQ3 to the third field effect transistor Q3, the current IQ4 to the fourth field effect transistor Q4, and drive signals VQ1GS–VQ4GS respectively supplied across the gate and source of the first through fourth field effect transistors Q1–Q4. In FIG. 7, waveforms for one switching cycle are shown, and respective periods t0–t1, t1–t2, t2–t3 and t3–t4 (=t0) are corresponding to the terms T1, T2, T3 and T4, respectively.

Embodiment 3

A circuit formation of Embodiment 3 is shown in FIG. 8, with FIG. 11 made as the basic formation. In the circuit formation, a difference from Embodiment 1 resides in that, in place of the series circuit of the two rectifying elements D5 and D6, a series circuit of fifth and sixth field effect transistors Q5 and Q6 is provided, in parallel connection with the capacitor C1. The respective field effect transistors Q1–Q6 are subjected to such switching drive as in the following, by means of ON/OFF signals provided from a control device.

Figure 9A:
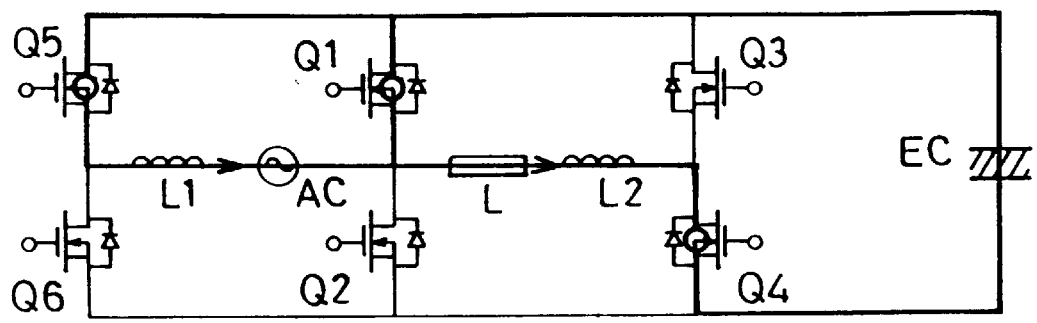
FIGS. 9a–9d are circuit diagrams showing an operation in the other power source polarity of the embodiment of FIGS. 8a–8d.
Figure 9B:
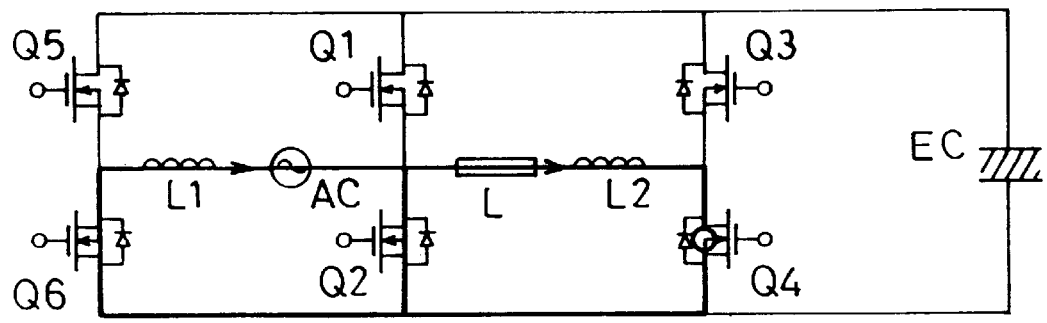
Figure 9C:
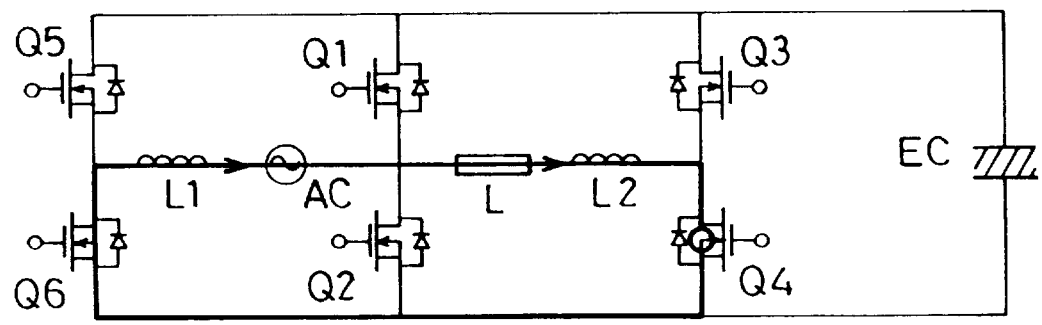
Figure 9D:
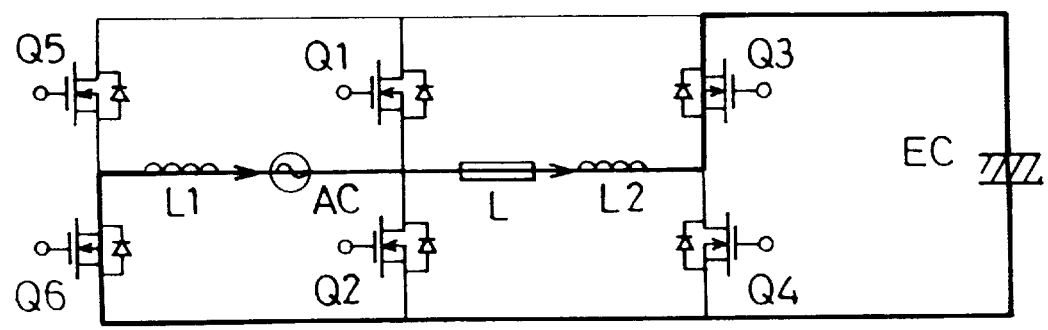

First, when the polarity of the power source AC is negative on the side of the junction point of the first and second field effect transistors Q1 and Q2, the circuit operates in the order of a period in which the second, third and sixth field effect transistors Q2, Q3 and Q6 are made ON (see FIG. 8a), a period in which the third field effect transistor Q3 is made ON (see FIG. 8b or 8c) and a period in which the first through sixth field effect transistors Q1 through Q6 are made OFF, whereas, when the polarity of the power source AC is positive on the side of the junction point of the first and second field effect transistors Q1 and Q2 as shown in FIG. 9, the circuit operates in the order of a period in which the first, fourth and fifth field effect transistors Q1, Q4 and Q5 are made ON (see FIG. 9a), a period in which the second and fourth field effect transistors Q2 and Q4 are made ON (see FIG. 9b or 9c), and a period in which the first through sixth field effect transistors Q1 through Q6 are made OFF (see FIG. 9d).

Referring from the viewpoint of the current loop to the operation when the polarity of the power source AC is negative on the side of the junction point of the first and second field effect transistors Q1 and Q2, similarly to Embodiments 1 and 2, the period in which the second, third and sixth field effect transistors Q2, Q3 and Q6 are made ON (FIG. 8a) is a term (which shall be referred to as T1) in which there exist concurrently a state at which the current of the first power converting circuit CNV1 forms a closed loop comprising the power source AC, first inductor L1, sixth field effect transistor Q6 and second field effect transistor Q2, and a state at which the current of the second power converting circuit CNV2 forms a closed loop comprising the capacitor EC, third field effect transistor Q3, second inductor L2, load circuit L and second field effect transistor Q2. In the period in which the third field effect transistor Q3 is made ON (FIG. 8b or 8c), next, there exist two states depending on the magnitude relation between the current flowing to the first inductor L1 and the current to the second inductor L2.

In an event when the absolute value of the current to the first inductor L1 is smaller than the absolute value of the current to the second inductor L2 (FIG. 8b), it becomes a term (which shall be referred to as T2) in which there exist concurrently a state at which the current of the first power converting circuit CNV1 forms a closed loop comprising the power source AC, first inductor L1, fifth field effect transistor Q5 and first field effect transistor Q1, and a state at which the current of the second power converting circuit CNV2 forms a closed loop comprising the second inductor L2, load circuit L, first field effect transistor Q1 and third field effect transistor Q3. Further, upon coincidence of the absolute value of the current of the first inductor L1 with the absolute value of the current of the second inductor L2 (FIG. 8c), the currents from the first and second power converting circuit CNV1 and CNV2 are mutually cancelled, as a result of which the sum total of the currents flowing to the switching elements used in common will be zero, so that, in practice, there is formed no closed loop of the current passing through the commonly used switching elements within the respective power converting circuits, and it becomes a term (which shall be referred to as T3) in which there exists a state forming a closed loop comprising the first inductor L1, fifth field effect transistor Q5, third field effect transistor Q3, second inductor L2, load circuit L and power source AC.

Further, in the period in which the first through sixth field effect transistors Q1 through Q6 are made OFF (FIG. 8d), the currents from the respective first and second power converting circuits CNV1 and CNV2 are mutually cancelled, as a result of which the sum total of the currents flowing to the switching elements used in common will be zero, so that, in practice, there is formed no closed loop of the currents passing through the commonly used switching elements within the respective power converting circuits, and it becomes a term (which shall be referred to as T4) in which there exists a state forming a closed loop comprising the first inductor L1, fifth field effect transistor Q5, capacitor EC, fourth field effect transistor Q4, second inductor L2, load circuit L and power source AC.

The action in the respective terms T1–T4 shall be described in relation to the first power converting circuit forming the boost converter and the second power converting circuit forming the buck converter. With reference to the first power converting circuit forming the boost converter, T1 and T2 are the terms for charging an energy in the first inductor L1 acting as the choke of boost, and the terms T3 and T4 are for discharging the energy accumulated in the first inductor L1. With reference to the second power converting circuit forming the buck converter, the term T1 is for charging an energy in the second inductor L2 acting as the choke of the buck, and the terms T2, T3 and T4 are for discharging the energy accumulated in the second inductor L2.

In the term T1, the current flowing through the second field effect transistor Q2 is decreased as a result that the forward directional current caused by the second power converting circuit CNV2 and the backward directional current caused by the first power converting circuit CNV1 to flow to the second field effect transistor Q2 are mutually superposed, and the effect of reducing the switching loss is realized.

In the term T2, the current flowing through the first field effect transistor Q1 is decreased as a result that the forward directional current caused by the first power converting circuit CNV1 and the backward directional current caused by the second power converting circuit CNV2 to flow to the first field effect transistor Q1 are mutually superposed, and the effect of reducing the switching loss is realized.

In the term T3, the sum total of the currents flowing to the commonly used switching elements will be zero as a result that the currents from the first power converting circuit COVL and from the second power converting circuit CNV2 are mutually cancelled, and, in practice, there is formed no closed loop of the current through the commonly used switching elements within the respective power converting circuits, so that there flows no current at all to the first and second field effect transistors Q1 and Q2, even though the power converting circuits are operating, and the effect of causing no power loss to occur is realized.

In the term T4, the sum total of the currents flowing to the commonly used switching elements as a result that the currents from the first and second power converting circuits CNV1 and CNV2 are mutually cancelled, and, in substance, there is formed no closed loop of the current through the commonly used switching elements within the respective power converting circuits, so that there flows no current at all to the first and second field effect transistors Q1 and Q2, even though the power converting circuits are operating, and the effect of causing no power loss to occur is realized.

Figure 10:
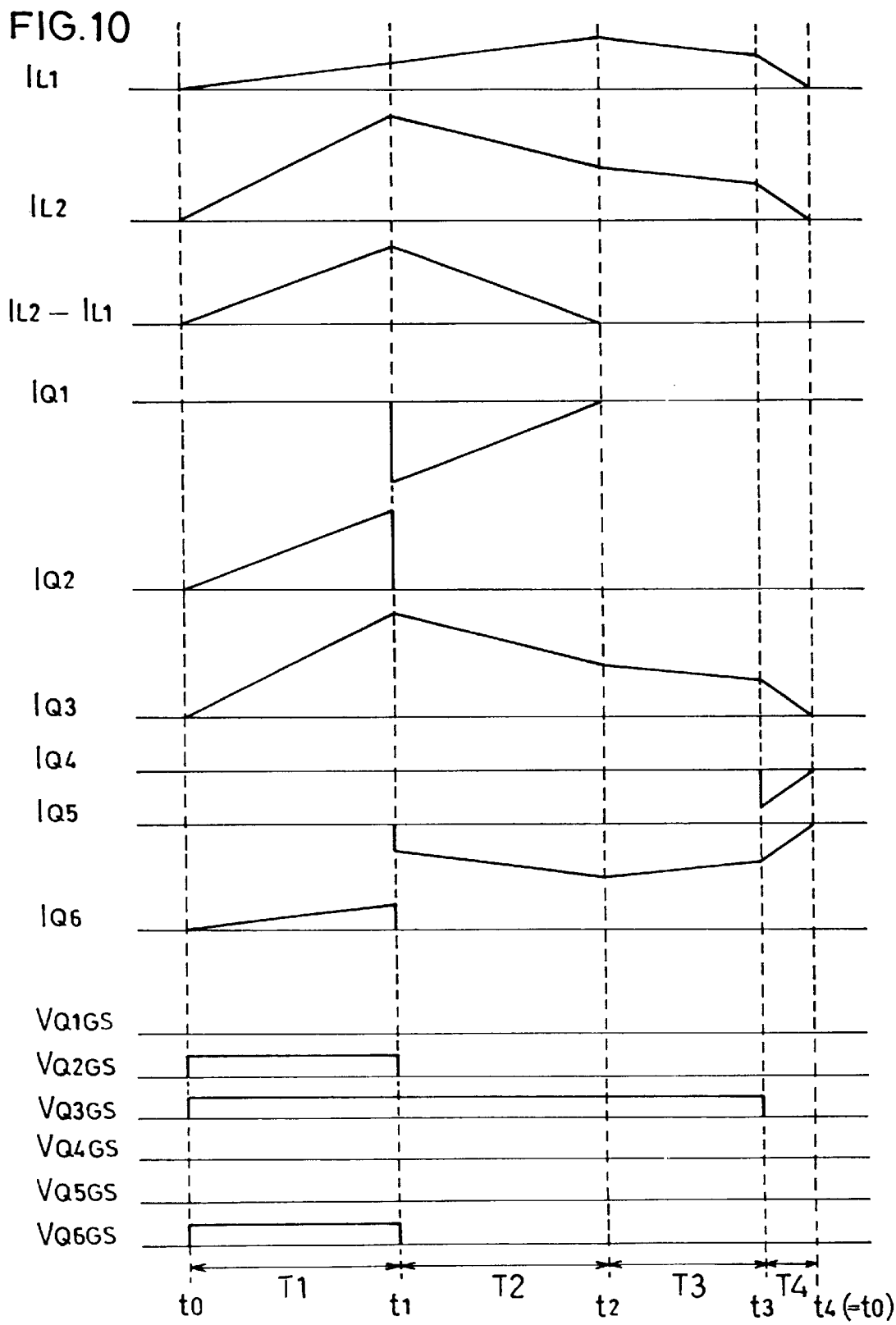
FIG. 10 is an operational waveform diagram at respective parts in the embodiment of FIGS. 8a–8d.

The operation in the event where the polarity of the power source AC is inverse is shown in FIG. 9, and waveforms at respective parts are shown in FIG. 10, in which there are shown the current IL1 flowing to the first inductor L1, the current IL2 to the second inductor L2, the difference IL2–IL1 between the currents flowing to the second inductor L2 and to the first inductor L1, the currents IQ1–IQ6 flowing respectively to the first through sixth field effect transistors Q1–Q6, and drive signals VQ1GS–VQ6GS respectively supplied across the gate and source of each of the first to sixth field effect transistors Q1–Q6. In FIG. 10, the waveforms are shown for one cycle of the switching, and the periods t0–t1, t1–t2, t2–t3 and t3–t4 (=t0) are corresponding to the terms T1, T2, T3 and T4, respectively.

Embodiment 4

Figure 19:
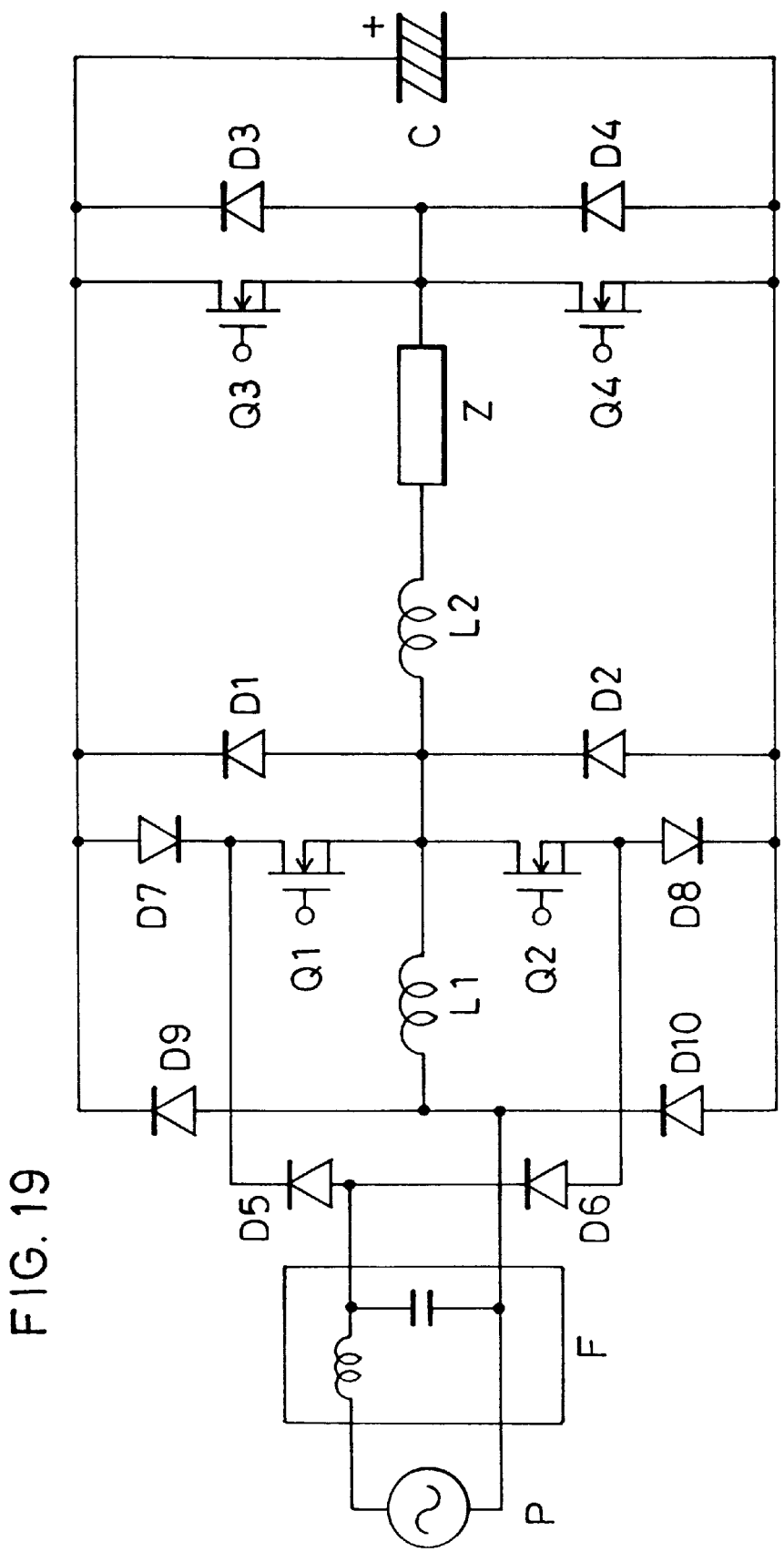
FIG. 19 is a circuit diagram showing another embodiment according to the present invention.

A circuit formation of Embodiment 4 is shown in FIGS. 20a–20c and FIGS. 21a–21c as an aspect embodying the circuit formation of FIG. 19.

Figure 20A:
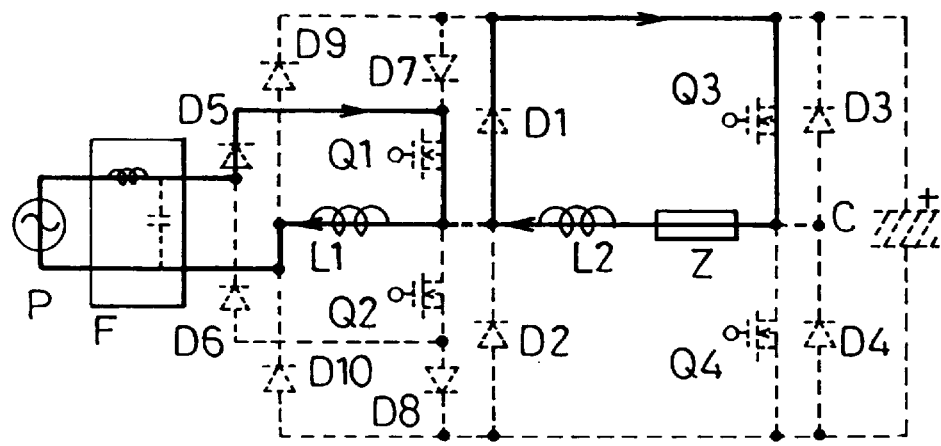
FIGS. 20a–20c are circuit diagrams showing an operation in one power source polarity in still another embodiment according to the present invention.

In a half cycle in which the AC power source P is positive and the switching elements Q1 and Q3 are ON but the switching elements Q2 and Q4 are OFF, a current flows, as shown in FIG. 20a, from the AC power source P as a current source through a path of the diode D5, switching element Q1 and inductor L1, to have an energy accumulated in the inductor L1. Also, a regenerative current caused by an accumulated energy in the inductor L2 flows from the inductor L2 as a current source through a path of a diode D1, switching element Q3 and load circuit Z.

Figure 20B:
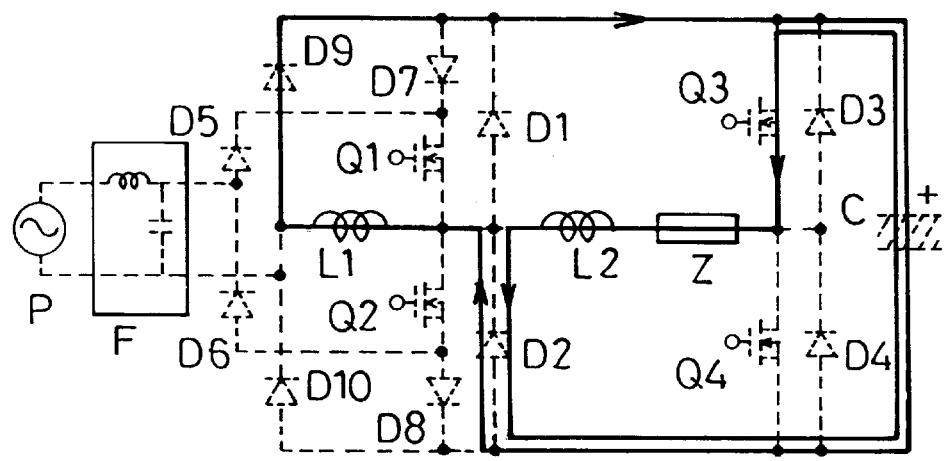

Next, when the switching elements Q2 and Q3 are ON but the switching elements Q1 and Q4 are OFF, a regenerative current caused by the accumulated energy in the inductor L1 flows through the inductor L1, and a current from the smoothing capacitor C as a current source flows through the inductor L2. Here, in an event when the current value flowing through the inductor L1 is larger than the current value flowing through the inductor L2, there flows a current from the inductor L1 as a current source, as shown in FIG. 20b, through a path of a diode D9, smoothing capacitor C and diode D2, to have the smoothing capacitor C charged. Further, so long as a current in forward direction is flowing through the diode D2 due to the current loop with the inductor L1 made as the current source, a current in backward direction can also flow through the diode D2 in accordance with its characteristic, so that, from the smoothing capacitor C as a current source, a current flows through a path of the switching element Q3, load circuit Z, inductor L2 and diode D2, and a voltage of the smoothing capacitor C is supplied to the load circuit Z as dropped by means of the inductor L2. At this time, the current of the current loop from the inductor L1 as the source and the current of the current loop from the smoothing capacitor C as its source are flowing in mutually opposite direction so as to cancel each other, and the value of current flowing through the diode D2 is made small.

Figure 20C:
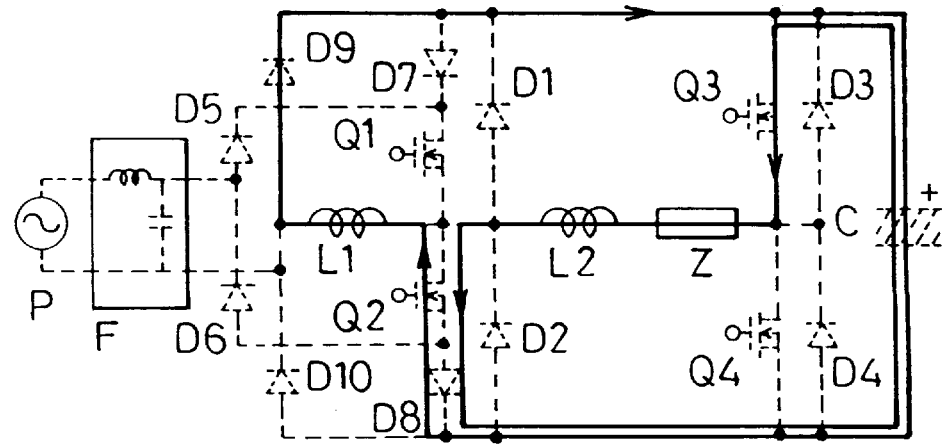

When on the other hand the value of current flowing through the inductor L1 is smaller than the value of current flowing through the inductor L2, a current flows, as shown in FIG. 20c, from the inductor L1 as the current source through a path of the diode D9, smoothing capacitor C, diode D8 and switching element Q2, and the smoothing capacitor C is charted. Also, a current flows from the smoothing capacitor C as the current source, through a path of the switching element Q3, load circuit Z, inductor L2, switching element Q2 and diode D8, and the voltage of the smoothing capacitor C is supplied to the load circuit Z as dropped by means of the inductor L2. At this time, the current of the current loop from the inductor L1 as the source and the current of the current loop from the smoothing capacitor C as the source are to flow mutually in opposite directions to cancel each other at the switching element Q2 and diode D8, and the value of the current flowing to the switching element Q2 and diode D8 is made small. Thereafter, a state in which the switching elements Q1 and Q3 are ON while the switching elements Q2 and Q4 are OFF and a state in which the switching elements Q2 and Q3 are ON while the switching elements Q1 and Q4 are OFF (FIGS. 20a and 20b or FIGS. 20a and 20c) are repeated at a high frequency, and a DC voltage in one direction is supplied to the load circuit Z.

Figure 21A:
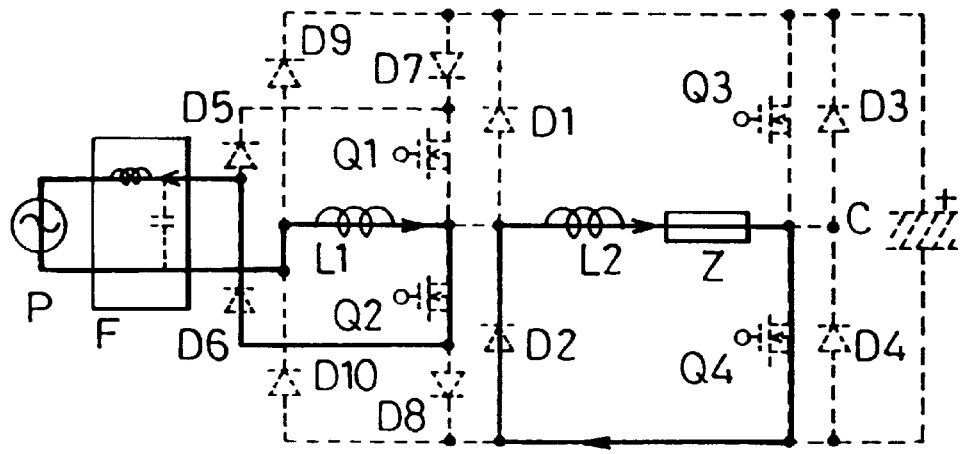
FIGS. 21a–21c are circuit diagrams showing an operation in the other power source polarity of the embodiment of FIG. 20, FIGS. 22a–22c are circuit diagrams showing an operation in one power source polarity of still another embodiment of the present invention.

Next, when the switching elements Q2 and Q4 are ON while the switching elements Q1 and Q3 are OFF in the negative half cycle of the AC power source P, as shown in FIG. 21a, a current flows from the AC power source P as the current source through a path of the inductor L1, switching element Q2 and diode D6, and an energy is accumulated in the inductor L1. Also a regenerative current caused by the accumulated energy in the inductor L2 flows from the inductor L2 as the source through a path of the load circuit Z, switching element Q4 and diode D2.

Figure 21B:
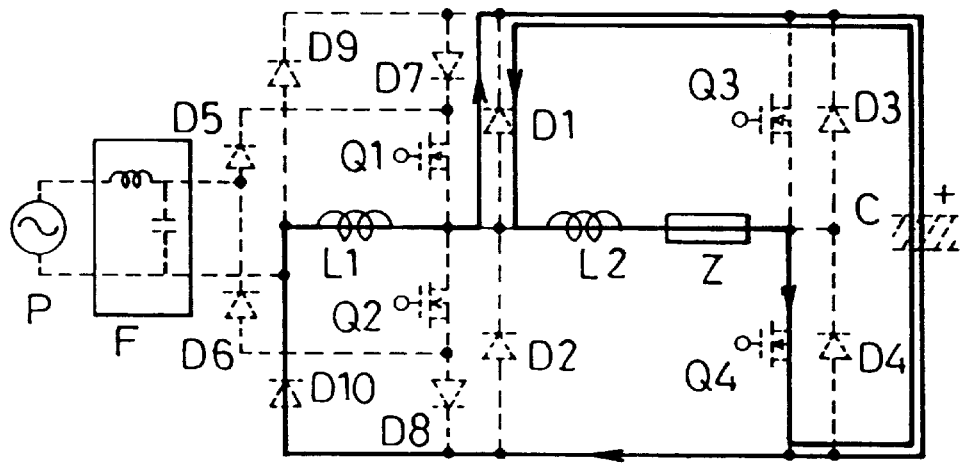

Next, as the switching elements Q1 and Q4 are made ON while the switching elements Q2 and Q3 are made OFF, a regenerative current caused by the accumulated energy in the inductor L1 flows through the inductor L1, and a current from the smoothing capacitor C as the current source flows through the inductor L2. Here, in an event when the value of the current flowing through the inductor L1 is larger than the value of the current flowing through the inductor L2, the current flows, as shown in FIG. 21b, from the inductor L1 as the current source, through a path of the diode D1, smoothing capacitor C and diode D1, and the smoothing capacitor C is charged. Also with the smoothing capacitor C made as the current source, the current flows through a path of the diode D1, inductor L2, load circuit Z and switching element Q4, and the voltage at the smoothing capacitor C is supplied to the load circuit Z as dropped by the inductor L2. At the diode D1, at this time, the current of the loop from the inductor L1 as the source and the current of the loop from the smoothing capacitor C as the source are to flow mutually in opposite directions to cancel each other, and the current value at the diode D1 is made small.

Figure 21C:
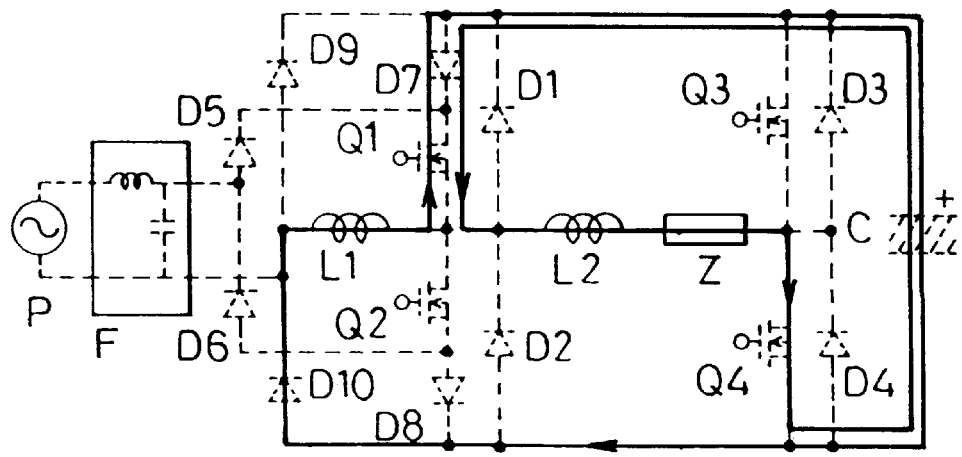

In an event when the value of the current flowing through the inductor L1 is smaller than the value of the current flowing through the inductor L2, the current flows, as shown in FIG. 21c, from the inductor L1 as the source through a path of the switching element Q1, diode D7, smoothing capacitor C and diode D10, and the smoothing capacitor C is charged. Also from the smoothing capacitor C as the source, the current flows through a path of the diode D7, switching element Q1, inductor L2, load circuit Z and switching element Q4, and the voltage at the smoothing capacitor C is supplied to the load circuit Z as dropped by the inductor L2. In the diode D7 and switching element Q1 at this time, the current of the loop from the inductor L1 as the source and the current of the loop from the smoothing capacitor C as the source are to flow mutually in opposite directions to cancel each other, and the current value at the diode D7 and switching element Q1 is made small. Thereafter, a state at which the switching elements Q2 and Q4 are ON while the switching elements Q1 and Q3 are OFF, and a state at which the switching elements Q1 and Q4 are ON while the switching elements Q2 and Q3 are OFF (FIGS. 21a and 21b or FIGS. 21a and 21c) are repeated at a high frequency, and an inverse directional DC voltage is supplied to the load circuit Z. With the foregoing operation, a square wave voltage inverted in the polarity in synchronism with the respective half cycles of the AC power source P is supplied to the load circuit Z.

That is, in the present embodiment, as shown in FIGS. 20b and 20c and FIGS. 21b and 21c, the current on the inductor L1 side and the current on the inductor L2 side flow mutually in opposite directions so as to cancel each other at the switching element Q1 and diodes D7 and D1 or the switching element Q2 and diodes D8 and D2 which are used in common in the buck-boost converter and buck converter, irrespective of the magnitude of the respective values of the currents flowing through the inductors L1 and L2, so that there arises an advantage that the withstand amount of current can be decreased to be able to lower the withstand voltage of the commonly used switching elements and diodes, and the costs can be contrived to be decreased. Further, since the buck-boost operation and the buck operation can be executed independently of each other, there is an advantage that the input power can be controlled in conformity to the output power. Accordingly, it is enabled to cause a large current to flow to the load without exessively enlarging the input power with respect to the output power, even at a state where the load impedance is low, at a starting step of a high pressure discharge lamp in an event when the present embodiment is applied to a lighting device of the high pressure discharge lamp.

Further, with the employment of the controlling arrangement of the present embodiment, there arises an advantage that an excessive voltage can be prevented from occurring as an across voltage of the smoothing capacitor, since the current on the buck converter side is not caused to return to the smoothing capacitor side but its energy is consumed at the load circuit Z, as shown in FIGS. 20 and 21, even at the state where the load impedance is low.

Embodiment 5

A circuit formation of Embodiment 5 is shown in FIGS. 22a–22c and FIGS. 23a–23c as other aspects embodying the circuit formation of FIG. 19.

In the positive half cycle of the AC power source P and when the switching element Q1 is made ON but other switching elements Q2, Q3 and Q4 are made OFF, a current is caused to flow from the AC power source P as the current source through a path of the diode D5, switching element Q1 and inductor L1, and an energy is accumulated in the inductor L1. Also, a regenerative current due to the accumulated energy in the inductor L2 is caused to flow from the inductor L2 as a current source through a path of the diode D1, smoothing capacitor C, diode D4 and load circuit Z.

Figure 22A:
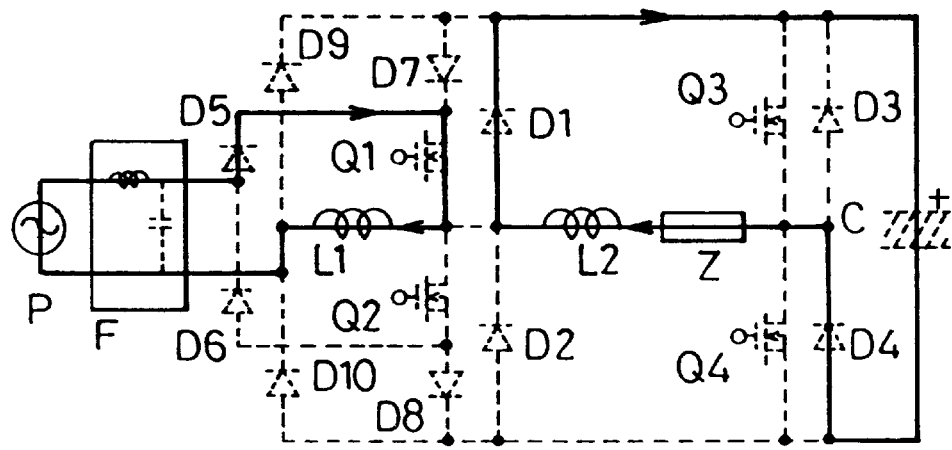
Figure 22B:
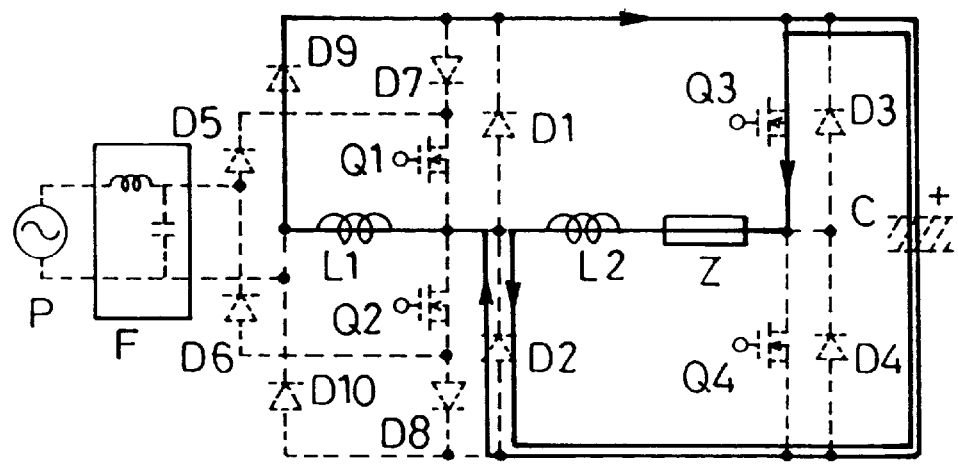
Figure 22C:
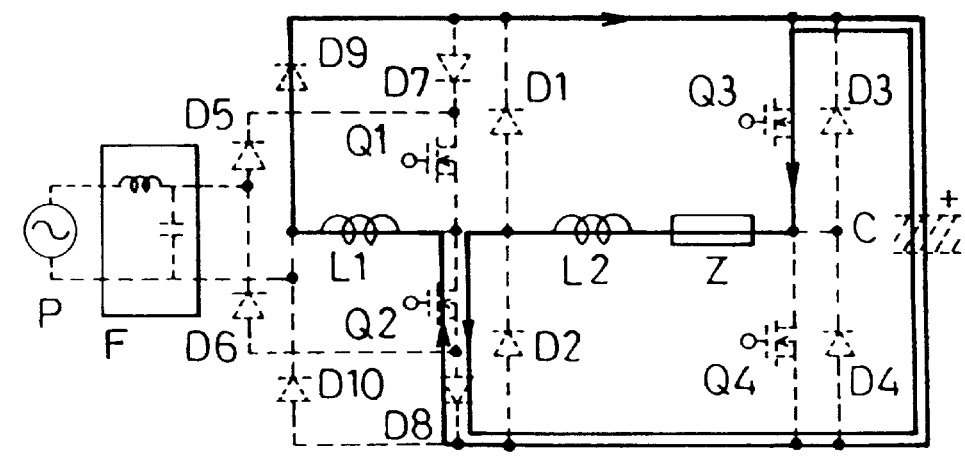

Next, when the switching elements Q2 and Q3 are ON and the switching elements Q1 and Q4 are OFF, a regenerative current due to the accumulated energy in the inductor L1 flows through this inductor L1, and a current is caused to flow from the smoothing capacitor C as a current source to the inductor L2. Here, in an event when the value of the current flowing through the inductor L1 is larger than the value of the current through the inductor L2, the current flows, as shown in FIG. 22b, from the inductor L1 as the source through a path of a diode D9, smoothing capacitor C and diode D2, to have the smoothing capacitor C charged. Also, the current from the smoothing capacitor C as the current source flows through a path of the switching element Q3, load circuit Z, inductor L2 and diode D2, so that the voltage at the smoothing capacitor C is supplied to the load circuit Z as dropped by the inductor L2. At this time, the current of the current loop with the inductor L1 made as the current source and the current of the current loop with the smoothing capacitor C made as the current source are flowing in mutually opposite directions at the diode D2 so as to cancel each other, so as to render the value of current flowing to the diode D2 to be smaller. When on the other hand the value of current flowing through the inductor L1 is smaller than the value of current flowing through the inductor L2, the diode D9 and smoothing capacitor C are charged with the inductor L1 made as the current source, as shown in FIG. 22c. Also, the current flows from the smoothing capacitor C as the current source through a path of the switching element Q3, load circuit Z, inductor L2, switching element Q2 and diode D8, and the voltage at the smoothing capacitor C is supplied to the load circuit Z as dropped by the inductor L2. At this time, the current of the loop from the inductor L1 as the current source and the current of the loop with the smoothing capacitor C as the current source are flowing mutually in opposite directions to cancel each other at the switching element Q2 and diode D8, and the current value at these switching element Q2 and diode D8 becomes smaller. Thereafter, the state at which the switching element Q1 is ON and the switching elements Q2–Q4 are OFF as well as a state in which the switching elements Q2 and Q3 are ON and the switching elements Q1 and Q4 are OFF (FIGS. 22a and 22b or FIGS. 22a and 22c) are repeated at a high frequency, and a DC voltage in one direction is supplied to the load circuit Z.

Figure 23A:
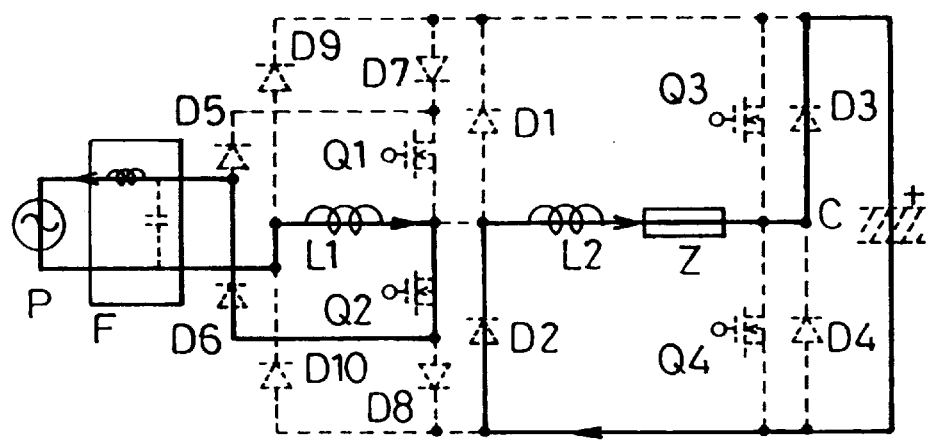
FIGS. 23a–23c are circuit diagrams showing an operation in the other power source polarity of the embodiment of FIGS. 20a–20c.
Figure 23B:
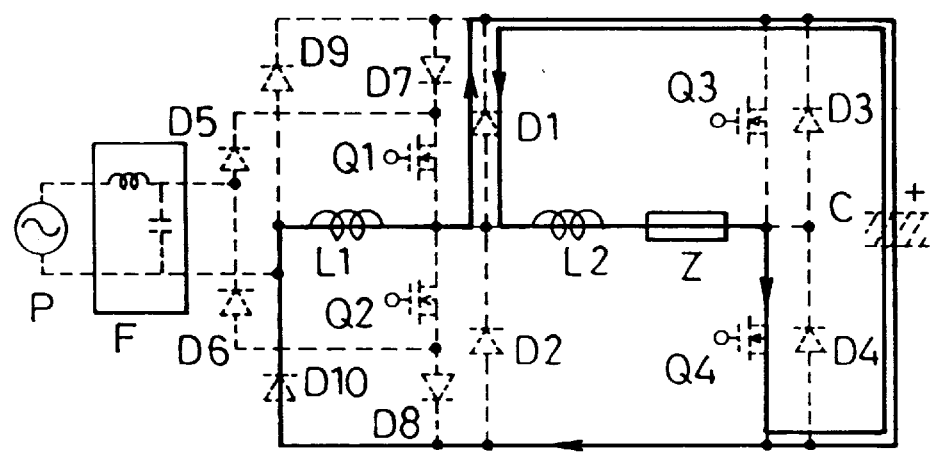
Figure 23C:
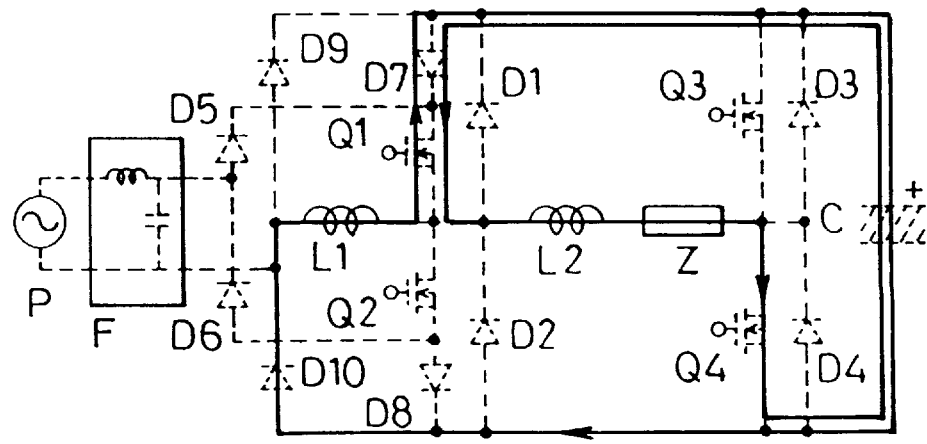
Figure 24:
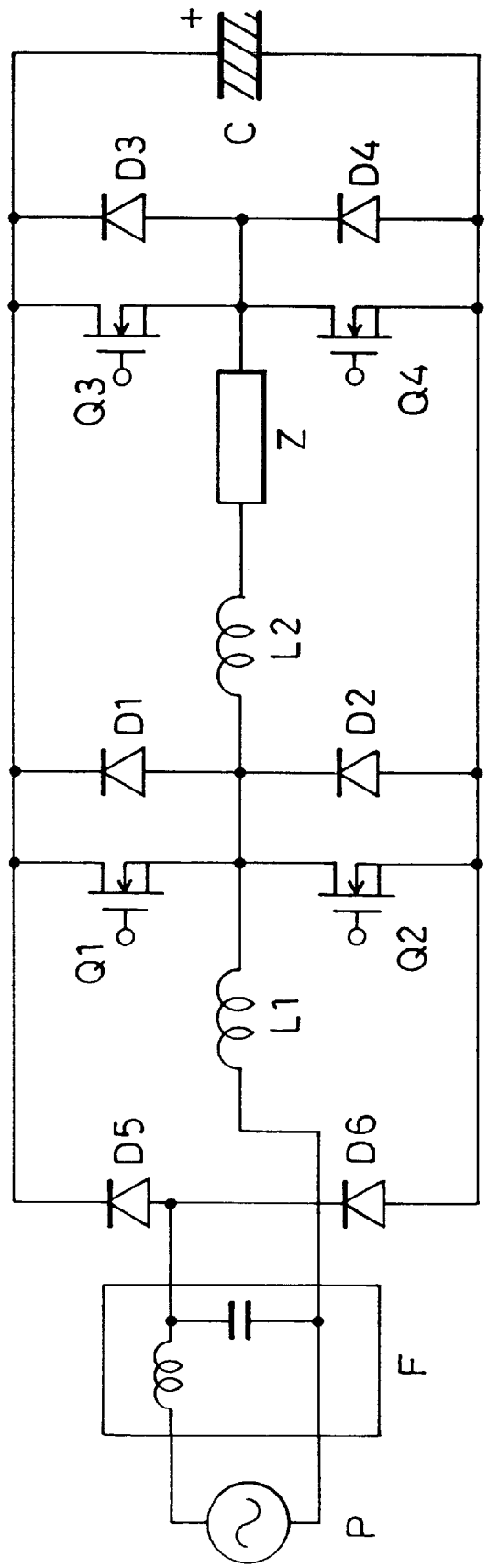
FIG. 24 is a circuit diagram showing a formation of a conventional power source device.
Figure 25A:
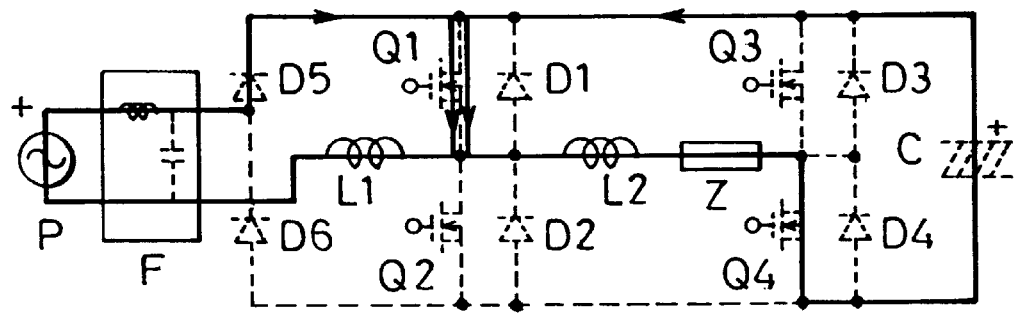
FIGS. 25a–25d are circuit diagrams showing an operation of the conventional power source device of FIG. 24, FIGS. 26a and 26b are circuit diagrams showing an operation in one power source polarity of a conventional power source device.
Figure 25B:
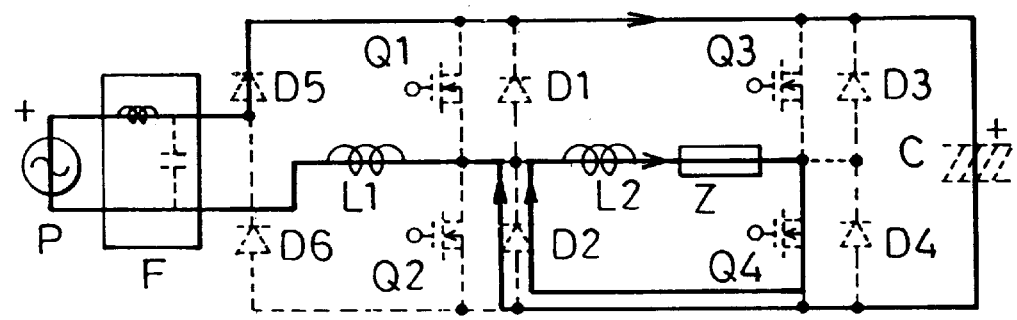
Figure 25C:
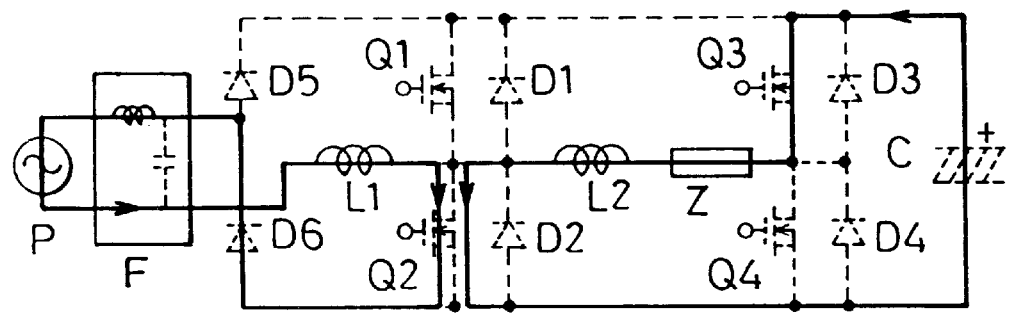
Figure 25D:
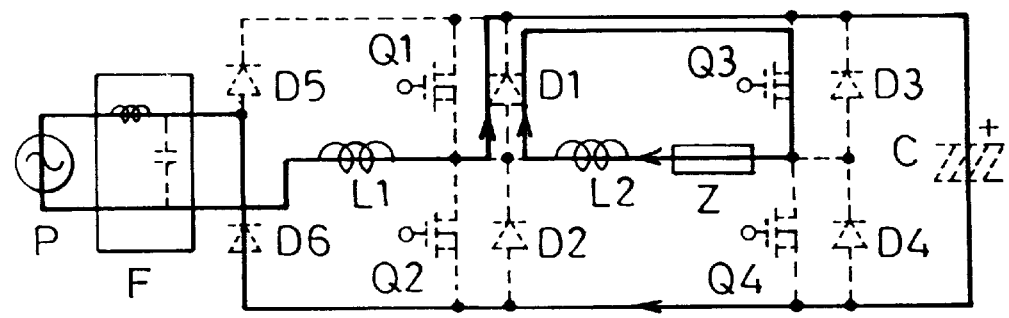
Figure 26A:
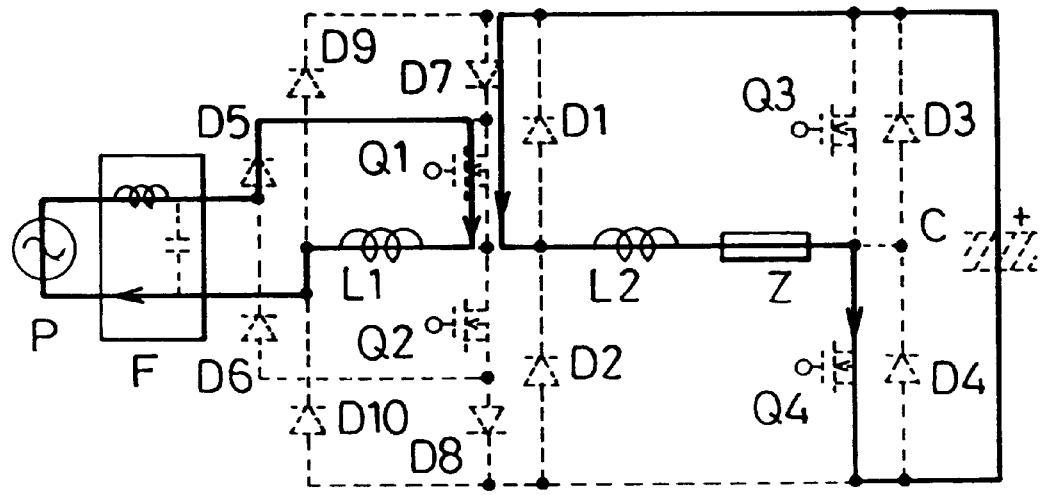
Figure 26B:
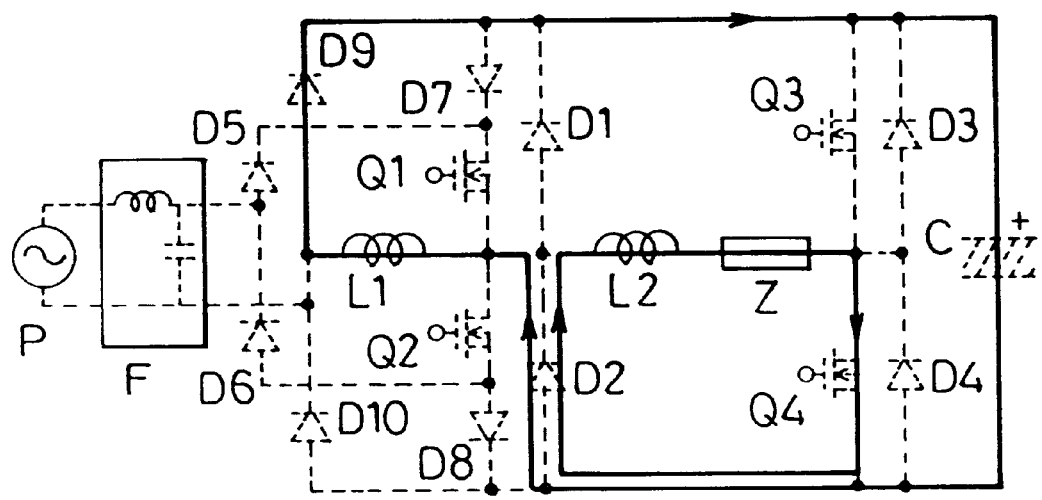
Figure 27A:
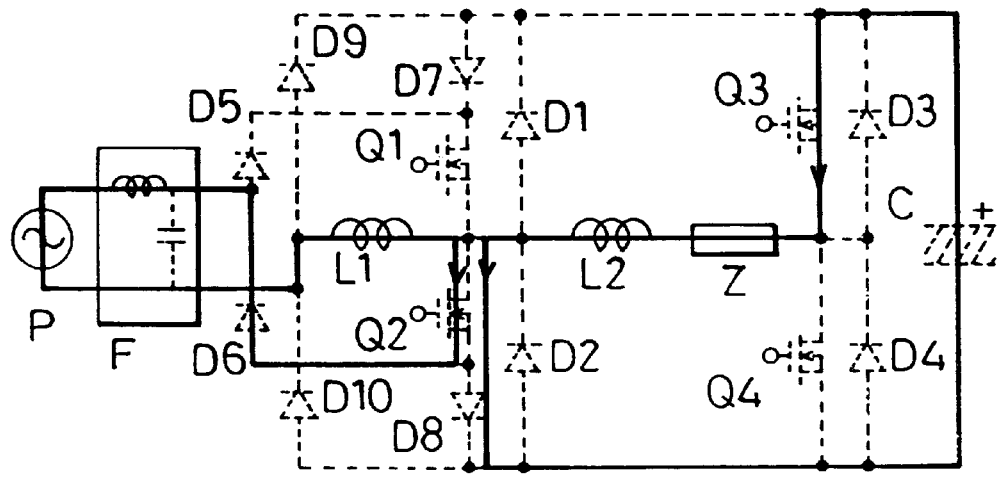
FIGS. 27a and 27b are circuit diagrams showing an operation in one power source polarity of the power source device of FIGS. 26a and 26b.
Figure 27B:
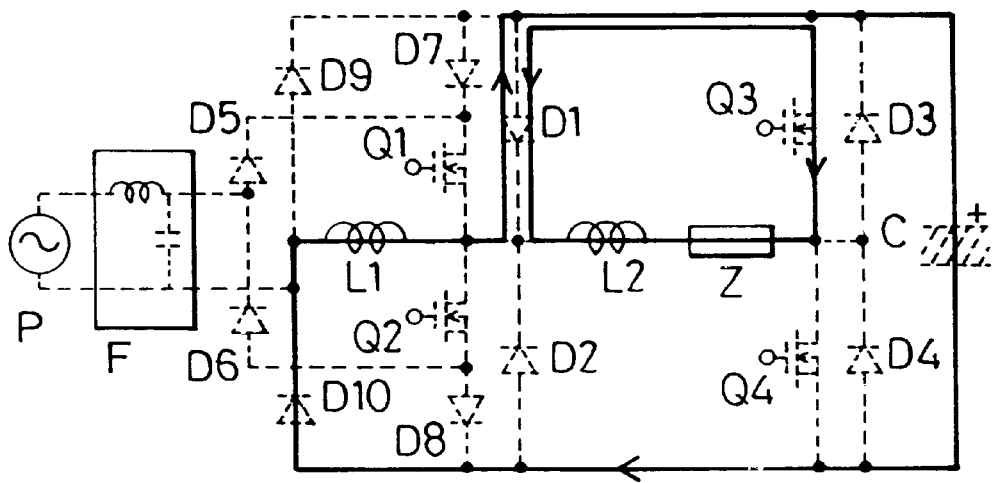

Next, in the negative half cycle of the AC power source P and when the switching element Q2 is ON while the switching elements Q1, Q3 and Q4 are OFF, a current flows, as shown in FIG. 23a, from the AC power source P through a path of the inductor L1, switching element Q2 and diode D6, and an energy is accumulated in the inductor L1. Further, a regenerative current due to the accumulated energy in the inductor L2 is caused to flow from the inductor L2 as the source through a path of the load circuit Z, diode D3, smoothing capacitor C and switching element Q2.

When the switching elements Q1 and Q4 are ON and the switching elements Q2 and Q3 are OFF, next, a regenerative current due to the accumulated energy of the inductor L1 flows through the inductor L1, and the current from the smoothing capacitor C as the current source flows through the inductor L2. Here, when the value of current flowing through the inductor L1 is larger than the value of current flowing through the inductor L2, a current flows from the inductor L1 as the current source through a path of the diode D1, smoothing capacitor C and diode D10, and the smoothing capacitor C is charged. A current is caused to flow from the smoothing capacitor C as the source through a path of the diode D1, inductor L2, load circuit Z and switching element Q4, and the voltage at the smoothing capacitor C is supplied to the load circuit Z as dropped by the inductor L2. At this time, the current of the loop with the inductor L1 made as the current source and the current of the loop with the smoothing capacitor C made as the current source are flowing in opposite directions to cancel each other at the diode D1, and the current value is decreased at the diode D1.

When the current value at the inductor L1 is smaller than the current value at the inductor L2, on the other hand, a current flows from the inductor L1 as the current source through a path of the switching element Q1, diode D7, smoothing capacitor C and diode D10, and the smoothing capacitor C is charged. Also a current flows from the smoothing capacitor C through a path of the diode D7, switching element Q1, inductor L2, load circuit Z and switching element Q4, and the voltage at the smoothing capacitor C is supplied to the load circuit Z as dropped by the inductor L2. At this time, the current of the loop with the inductor L1 made as the current source and the current of the loop with the smoothing capacitor C are flowing mutually in opposite directions to cancel each other at the diode D1, and the current value at the diode D7 and switching element Q1 is decreased. Thereafter, a state at which the switching element Q2 is ON and the switching elements Q1, Q3 and Q4 are OFF and a state at which the switching elements Q1 and Q4 are ON and the switching elements Q2 and Q3 are OFF (FIGS. 23a and 23b or FIGS. 23a and 23c) are repeated at a high frequency. With the above operation, a square wave voltage of a polarity inverting in synchronism with the respective half cycles of the AC power source P is supplied.

In the present embodiment, there arise such advantage that, similarly to Embodiment 4, the withstand current amount can be decreased at the switching element Q1, and diodes D7 and D1 or the switching element Q2 and diodes D8 and D2 commonly employed in the buck-boost converter and buck converters, the buck-boost operation and buck operation can be performed independently of each other, and so on.

We claim:

1. A power source device comprising:
   at least first and second power converting circuits,
   said first power converting circuit including first switching means for opening and closing a current path in response to driving signals, a first rectifying means and a first inductor, and said second power converting circuit including second switching means for opening and closing a current path in response to the driving signals, a second rectifying means and a second inductor; and
   a control circuit connected to the first and second power converting circuits for performing at least one of an inverse parallel connection of and a common use with the switching means incorporating a rectifying element of at least a set of the first switching means and second rectifying means and of the second switching means and first rectifying means, to generate at least one of the driving signals for closing the first switching means in a period in which the second rectifying means is conductive and for closing the second switching means in a period in which the first rectifying means is conductive in an event when neither of the inverse parallel connection and the common use is performed.

2. A power source device comprising:
   at least first and second power converting circuits,
   said first power converting circuit having a closed loop including at least a first switching means used in common by the first and second power converting circuit, a power source and a first inductor, said first switching means having an inverse directional current-passing element connected in parallel, and said second power converting circuit having a closed loop including at least a second switching means used in common by the first and second power converting circuits, a load circuit, a second inductor and a capacitor, said second switching means having an inverse directional current-passing element connected in parallel; and a control means connected to the first and second power converting circuits for controlling the operation of the circuits by setting a period in which, among currents flowing from the first and second power converting circuits to the first and second switching means, the current from at least one of the first and second power converting circuits has an inverse polarity with respect to the current from at least the other power converting circuit, both currents flowing thus in mutually cancelling direction in the set period.

3. The power source device of claim 2 wherein the first power converting circuit comprises one of a boost converter and a buck-boost converter, and the second power converting circuit comprises a buck converter.

4. The power source device of claim 3 wherein the first power converting circuit comprises one of the boost converter and the buck-boost converter with the power source made as an input and with the capacitor of the second power converting circuit made as an output, and the buck converter of the second power converting circuit comprises the capacitor of the second power converting circuit made as an input and the load circuit made as an output.

5. The power source device of claim 2 wherein the operation includes at least a period in which an energy of the power source is made as a supply source of the current flowing into the commonly used switching means from the first power converting circuit, and an energy of the inductor in the second power converting circuit is made as a supply source of the current flowing into the commonly used switching element from the second power converting circuit.

6. The power source device of claim 2 wherein the operation includes a period in which an energy of the power source is made as a supply source of the current flowing into the commonly used switching element from the first power converting circuit, and at least an energy of the capacitor is made as a supply source of the current flowing into the commonly used switching element from the second power converting circuit.

7. The power source device of claim 2 wherein the operation includes a period in which the energy of the power source and of the inductor in the first power converting circuit is made as a supply source of the current flowing into the commonly used switching element from the first power converting circuit, and at least an energy of the capacitor is made as a supply source of the current flowing into the commonly used switching element from the second power converting circuit.

8. The power source device of claim 2 wherein the operation includes a period in which the energy of the power source and of the inductor in the first power converting circuit is made as a supply source of the current flowing into the commonly used switching element from the first power converting circuit, and at least an energy of the inductor in the second power converting circuit is made as a supply source of the current flowing into the commonly used switching elements from the second power converting circuit.

9. The power source device of claim 2 wherein the operation includes a period in which the sum total of the currents flowing into the commonly used switching element is made zero as a result of the mutual cancellation of the currents from the respective power converting circuits, substantially no closed loop of the currents through the commonly used switching elements in the respective power converting circuits is formed, and a closed loop of the currents through the plurality of the power converting circuits is formed.

10. The power source device of claim 2 wherein a series connection of the first and second switching elements conforming in the forward direction, and a series connection of third and fourth switching elements conforming in the forward direction and respectively provided in parallel with an inverse directional current passing element are connected in parallel with a capacitor at the same polarity, a series connection of first and second rectifying elements is connected in parallel with the capacitor so that an end of the first rectifying element will coincide with one end of the first and third switching elements at the same polarity as the current passing elements provided in parallel with the first to fourth switching elements, a series connection of an AC power source through a filter and a first inductor is connected between a junction point of the two rectifying elements and a junction point of the first and second switching elements, and a series connection of the load circuit and a second inductor is connected between the junction point of the first and second switching elements and a junction point of the third and fourth switching elements.

11. The power source device of claim 10 wherein the first to fourth switching elements respectively provided in parallel with the inverse directional current passing element comprise first to fourth field effect transistors respectively having an inverse directional parasitic diode.

12. The power source device of claim 10 wherein the series connection of the AC power source and first inductor is connected on the side of the AC power source to the junction point of the first and second switching elements, and the series connection of the load circuit and second inductor is connected on the side of the load circuit to the junction point of the first and second switching elements.

13. The power source device of claim 10 wherein the operation includes a first period in which, when the polarity of the power source on the side of the junction point of the first and second switching elements is negative, a state at which the current from the first power converting circuit forms a closed loop comprising the power source, first inductor, one inverse directional current-passing element of the first rectifying element and fifth switching element, and first switching element as well as a state at which the current from the second power converting circuit forms a closed loop comprising the second inductor, load circuit, first switching element and third switching element exist concurrently, and a second period in which, when the polarity of the power source on the side of the junction point of the first and second switching elements is positive, a state at which the current from the first power converting circuit forms a closed circuit comprising the power source, second switching element, one inverse directional current-passing element of the second rectifying element and sixth switching element, and first inductor as well as a state at which the current from the second power converting circuit forms a closed loop comprising the second inductor, fourth switching element, second switching element and load circuit exist concurrently.

14. The power source device of claim 10 wherein the operation includes a first period in which, when the polarity of the power source on the side of the junction point of the first and second switching elements is negative, a state at which the current from the first power converting circuit forms a closed loop comprising the power source, first inductor, one inverse directional current-passing element of the first rectifying element and fifth switching element, and first switching element as well as a state at which the current from the second power converting circuit forms a closed circuit comprising the second inductor, load circuit, first switching element, capacitor and fourth switching element exist concurrently; and a second period in which, when the polarity of the power source on the side of the junction point of the first and second elements is positive, a state at which the current from the first power converting circuit forms a closed loop comprising the power source, second switching element, one inverse directional current-passing element of the second rectifying element and sixth switching element and first inductor as well as a state at which the current from the second power converting circuit forms a closed loop comprising the second inductor, third switching element, capacitor, second switching element and load circuit exist concurrently.

15. The power source device of claim 10 wherein the operation includes a first period in which, when the polarity of the power source on the side of the junction point of the first and second switching elements is negative, a state at which the current from the first power converting circuit forms a closed loop comprising the first inductor, one inverse directional current-passing element of the first rectifying element and fifth switching element, capacitor, second switching element and power source as well as a state at which the current from the second power converting circuit forms a closed loop comprising the second inductor, load circuit, second switching element and fourth switching element exist concurrently; and a second period in which, when the polarity of the power source on the side of the junction point of the first and second switching elements is positive, a state at which the current from the first power converting circuit forms a closed circuit comprising the first inductor, power source, first switching element, capacitor, one inverse directional current-passing element of the second rectifying element and sixth switching element, and first inductor as well as a state at which the current from the second power converting circuit forms a closed loop comprising the second inductor, third switching element, first switching element and load circuit exist concurrently.

16. The power source device of claim 10 wherein the operation includes a first period in which, when the polarity of the power source on the side of the junction point of the first and second switching elements is negative, a state at which the current from the first power converting circuit forms a closed loop comprising the first inductor, one inverse directional current-passing element of the first rectifying element and fifth switching element, capacitor, second switching element and power source as well as a state at which the current from the second power converting circuit forms a closed loop including the capacitor, third switching element, second inductor, load circuit and second switching element exist concurrently; and a second period in which, when the polarity of the power source on the side of the junction point of the first and second switching elements is positive, a state at which the current from the first power converting circuit forms a closed loop comprising the first inductor, power source, first switching element, capacitor, and one inverse current-passing element of the second rectifying element or sixth switching element as well as a state at which the current from the second power converting circuit forms a closed circuit comprising the capacitor, first switching element, load circuit, second inductor and fourth switching element exist concurrently.

17. The power source device of claim 10 wherein the operation includes a first period in which, when the polarity of the power source on the side of the junction point of the first and second switching elements is negative, a state at which a closed loop comprising the first inductor, one inverse directional current-passing element of the first rectifying element and fifth switching element, third switching element, second inductor, load circuit and power source is formed exists concurrently; and a second period in which, when the polarity of the power source on the side of the junction point of the first and second switching elements is positive, a state at which a closed loop comprising the first inductor, power source, load circuit, second inductor, fourth switching element and one inverse directional current-passing element of the second rectifying element and sixth switching element is formed exists.

18. The power source device of claim 10 wherein the operation includes a first period in which, when the polarity of the power source on the side of the junction point of the first and second switching elements is negative, a state at which a closed loop comprising the first inductor, one inverse directional current-passing element of the first rectifying element and fifth switching element, capacitor, fourth switching element, second inductor, load circuit and power source is formed exists; and a second period in which, when the polarity of the power source on the side of the junction point of the first and second switching elements is positive, a state at which a closed loop comprising the first inductor, power source, load circuit, second inductor, third switching element, capacitor and one inverse directional current-passing element of the second rectifying element and sixth switching element is formed exists.

19. The power source device of claim 10 wherein the control means is arranged for providing a state of switching the respective switching elements at a frequency higher than the power source frequency, in the order of, when the polarity of the power source on the side of the junction point of the first and second switching elements is negative, a period in which the second and third switching elements are made ON, a period in which the first and third switching elements are made ON and a period in which the first to fourth switching elements are made OFF and in the order of, when the polarity of the power source on the side of the junction point of the first and second switching elements is positive, a period in which the first and fourth switching elements are made ON, a period in which the second and fourth switching elements are made ON and a period in which the first to fourth switching elements.

20. The power source device of claim 10 wherein the control means is arranged for providing a state of switching the respective switching elements at a frequency higher than the power source frequency in the order of, when the polarity of the power source on the side of the junction point of the first and second switching elements is negative, a period in which the second and third switching elements are made ON, a period in which the second switching element only is made ON, and the first to fourth switching elements are made OFF, and in the order of, when the polarity of the power source on the side of the junction point of the first and second switching elements is positive, a period in which the first and fourth switching elements are made ON, a period in which the first switching element only is made ON and a period in which the first to fourth switching elements are made OFF.

21. The power source device of claim 2 wherein a series connection of the first and second switching elements conforming in the forward direction, a series connection of third and fourth switching elements conforming in the forward direction and respectively provided in parallel with an inverse directional current-passing element and a series connection of fifth and sixth switching elements conforming in the forward direction and respectively provided in parallel with an inverse directional current-passing element are connected in parallel to the capacitor in the same polarity, a series connection of an AC power source and a first inductor is connected between a junction point of the first and second switching elements and a junction point of the fifth and sixth switching elements, and a series connection of the load circuit and second inductor is connected between the junction point of the first and second switching elements and a junction point of the third and fourth switching elements.

22. The power source device of claim 21 wherein the first to sixth switching elements respectively provided in parallel with the inverse directional current-passing element comprise first to sixth field effect transistors respectively having an inverse directional parasitic diode.

23. The power source device of claim 21 wherein the operation includes a first period in which, when the polarity of the power source on the side of the junction point of the first and second switching elements is negative, a state at which the current from the first power converting circuit forms a closed loop comprising the power source, first inductor, sixth switching element and second switching element as well as a state at which the current from the second power converting circuit forms a closed loop comprising the capacitor, third switching element, second inductor, load circuit and second switching element exist concurrently; and a second period in which, when the polarity of the power source on the side of the junction point of the first and second switching elements is positive, a state at which the current from the first power converting circuit forms a closed loop comprising the power source, first switching element, fifth switching element and first inductor as well as a state at which the current from the second power converting circuit forms a closed loop comprising the capacitor, first switching element, load circuit, second inductor and fourth switching element exist concurrently.

24. The power source device of claim 2 wherein a series connection of first and second rectifying elements and a series connection of third and fourth rectifying elements are connected in inverse parallel to a capacitor, the series connection of third and fourth switching elements is connected in parallel to the capacitor, a series connection of fifth and sixth rectifying elements and a series connection of first and second switching elements are connected in inverse parallel, a series connection of seventh rectifying element, first and second switching elements and eighth rectifying element connected in this order and a series connection of ninth and tenth rectifying elements are connected in inverse parallel to said capacitor, a junction point of the first and second rectifying elements is connected to a junction point of the first and second switching elements, a junction point of the third and fourth rectifying elements is connected to a junction point of the third and fourth switching elements, a first inductor is connected between the junction point of the first and second switching elements and a junction point of the ninth and tenth rectifying elements, a series connection of a second inductor and a load circuit is connected between the junction point of the first and second switching elements and the junction point of the third and fourth switching elements, and an AC power source is connected through a filter circuit between a junction point of the fifth and sixth rectifying elements and the junction point of the ninth and tenth rectifying elements.

25. The power source device of claim 2 wherein the load circuit comprises a circuit including at least a discharge lamp, and an output current to the discharge lamp is substantially of a square wave of a low frequency.

* * * * *